(12) United States Patent
Morard et al.

(10) Patent No.: US 11,537,777 B2
(45) Date of Patent: Dec. 27, 2022

(54) SERVER FOR PROVIDING A GRAPHICAL USER INTERFACE TO A CLIENT AND A CLIENT

(71) Applicant: Huawei Technologies Co., Ltd., Guangdong (CN)

(72) Inventors: Jean-Pierre Morard, Issy les Moulineaux (FR); Eran Gampel, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 384 days.

(21) Appl. No.: 15/514,372

(22) PCT Filed: Sep. 25, 2014

(86) PCT No.: PCT/EP2014/070448
§ 371 (c)(1),
(2) Date: Mar. 24, 2017

(87) PCT Pub. No.: WO2016/045729
PCT Pub. Date: Mar. 31, 2016

(65) Prior Publication Data
US 2017/0270077 A1  Sep. 21, 2017

(51) Int. Cl.
*G06F 40/00* (2020.01)
*G06F 40/103* (2020.01)
(Continued)

(52) U.S. Cl.
CPC ............ *G06F 40/103* (2020.01); *H04L 67/01* (2022.05); *H04L 67/60* (2022.05);
(Continued)

(58) Field of Classification Search
CPC ........ G06F 17/211; H04L 67/32; H04L 67/42; H04L 69/16; H04N 21/4307
See application file for complete search history.

(56) References Cited

U.S. PATENT DOCUMENTS 5,424,785 A * 6/1995 Orphan ................ H04M 11/085
345/636
5,903,269 A   5/1999 Poreh et al.
(Continued)

FOREIGN PATENT DOCUMENTS

CN   1262748 A   8/2000
CN   101946493 A   1/2011
(Continued)

OTHER PUBLICATIONS

International Telecommunication Union, Advanced video coding for generic audiovisual services, ITU-T, H.264, Feb. 2014, 790 pages.
(Continued)

*Primary Examiner* — Cesar B Paula
*Assistant Examiner* — David Faber
(74) *Attorney, Agent, or Firm* — Slater Matsil, LLP

(57) ABSTRACT

The invention relates to a server for providing a graphical user interface to a client over a communication network. The graphical user interface comprises a graphical user interface element, the graphical user interface element being formed by an element shape and an element text, the element shape being represented by element shape data, the element text being represented by element text data. The server comprises an encoder configured to encode the element shape data into video data, a detector configured to detect a change associated with the graphical user interface element within the graphical user interface, and a communication interface configured to separately transmit the video data and the element text data over the communication network, the element text data being transmitted upon detection of the change associated with the graphical user interface element for providing the graphical user interface to the client.

19 Claims, 13 Drawing Sheets

(51) Int. Cl.
  *H04N 21/234* (2011.01)
  *H04N 21/8547* (2011.01)
  *H04N 21/44* (2011.01)
  *H04N 21/431* (2011.01)
  *H04N 21/43* (2011.01)
  *H04L 67/01* (2022.01)
  *H04L 67/60* (2022.01)
  *H04L 69/16* (2022.01)

(52) U.S. Cl.
  CPC ..... *H04N 21/23412* (2013.01); *H04N 21/431* (2013.01); *H04N 21/43074* (2020.08); *H04N 21/44012* (2013.01); *H04N 21/8547* (2013.01); *H04L 69/16* (2013.01)

(56) References Cited

U.S. PATENT DOCUMENTS

| | | | |
|---|---|---|---|
| 5,970,233 A * | 10/1999 | Liu | H04N 19/40 375/E7.198 |
| 7,310,769 B1 | 12/2007 | Dash | |
| 8,127,044 B2 | 2/2012 | Morard | |
| 8,149,917 B2 | 4/2012 | Zhang et al. | |
| 9,442,895 B1 * | 9/2016 | Dilts | G06F 17/214 |
| 2003/0011627 A1 | 1/2003 | Yager et al. | |
| 2007/0005795 A1 * | 1/2007 | Gonzalez | H04N 21/23412 375/E7.006 |
| 2007/0006065 A1 | 1/2007 | Jewsbury et al. | |
| 2009/0161767 A1 * | 6/2009 | Jang | H04N 19/176 375/240.24 |
| 2010/0211883 A1 | 8/2010 | Lee et al. | |
| 2011/0055322 A1 | 3/2011 | Gregersen | |
| 2011/0268191 A1 | 11/2011 | Morard | |
| 2013/0204927 A1 | 8/2013 | Kruglikov et al. | |
| 2014/0122998 A1 * | 5/2014 | Shin | G06F 17/2247 715/234 |
| 2014/0280517 A1 * | 9/2014 | White | H04L 67/04 709/203 |
| 2014/0289627 A1 * | 9/2014 | Brockmann | H04N 21/23412 715/719 |
| 2014/0289639 A1 | 9/2014 | Halim et al. | |
| 2015/0036154 A1 * | 2/2015 | Tian | G06K 15/1802 358/1.11 |

FOREIGN PATENT DOCUMENTS

| | | |
|---|---|---|
| CN | 103748553 A | 4/2014 |
| KR | 20100111739 A | 10/2010 |
| WO | 2014145921 A1 | 9/2014 |

OTHER PUBLICATIONS encoding.com, "Case Studies of our Happy Customers," (https://www.encoding.com/case-studies/), 10 pages.

encoding.com, "Playout Graphics and Editing," (https://www.encoding.com/playout-graphics-and-editing/#Text_Overlay), 7 pages.

* cited by examiner

SERVER FOR PROVIDING A GRAPHICAL USER INTERFACE TO A CLIENT AND A CLIENT

CROSS REFERENCE TO RELATED APPLICATIONS

The present application claims priority under 35 U.S.C. § 365 to International Patent Application No. PCT/EP2014/070448 filed Sep. 25, 2014 which is incorporated herein by reference into the present disclosure as if fully set forth herein.

TECHNICAL FIELD

The invention relates to the field of computer graphics, in particular to rendering of graphical user interfaces.

BACKGROUND

The provision of a graphical user interface over a communication network is of major interest for a number of applications. A graphical user interface is e.g. provided when streaming multimedia content from a server to a client.

The graphical user interface can comprise different graphical user interface elements which can allow for controlling a functionality of the client by a user. The graphical user interface is often referred to as a remote graphical user interface, since the rendering of the graphical user interface is usually performed remotely at the server. The rendered graphical user interface can consequently be transferred from the server to the client over the communication network.

The rendering of the graphical user interface at the server usually comprises a processing of the entire graphical user interface within a framebuffer of the server. The content of the framebuffer can then be encoded in order to transfer the graphical user interface to the client. Often, a hardware accelerator is used at the server for this purpose.

Common techniques, however, suffer from a lack of scalability in case of an increasing number of connected clients. Moreover, the rendering of an entire graphical user interface at the server can lead to a reduced encoding efficiency.

SUMMARY

It is an object of the invention to provide an efficient concept for providing a graphical user interface from a server to a client over a communication network.

This object is achieved by the features of the independent claims. Further implementation forms are apparent from the dependent claims, the description and the figures. The invention is based on the finding that a graphical user interface element within the graphical user interface can be provided more efficiently by providing an element shape and an element text of the graphical user interface element separately. The element shape is represented by video data and is encoded by the server. The element text is represented by element text data which is transmitted separately from the video data from the server to the client upon detection of a change associated with the graphical user interface element. The video data and the element text data is consequently received and combined at the client. Therefore, a high compression ratio and encoding efficiency of the graphical user interface can be achieved.

According to a first aspect, the invention relates to a server for providing a graphical user interface to a client over a communication network, the graphical user interface comprising a graphical user interface element, the graphical user interface element being formed by an element shape and an element text, the element shape being represented by element shape data, the element text being represented by element text data, the server comprising an encoder being configured to encode the element shape data into video data, a detector being configured to detect a change associated with the graphical user interface element within the graphical user interface, and a communication interface being configured to separately transmit the video data and the element text data over the communication network, the element text data being transmitted upon detection of the change associated with the graphical user interface element for providing the graphical user interface to the client. Thus, an efficient concept for providing a graphical user interface from a server to a client over a communication network can be realized.

The encoder can be configured to encode a framebuffer of the server, wherein the framebuffer comprises the element shape without the element text. The framebuffer can be a virtual framebuffer. The encoder can be configured to encode the element shape data into video data using a video codec, e.g. MPEG-4, ITU-T H.264, or ITU-T H.265.

The detector can be configured to detect the change associated with the graphical user interface element by monitoring the graphical user interface element. The element shape and the element text of the graphical user interface element can be provided separately by an application.

The communication interface can be configured to establish a communication link between the server and the client over the communication network. The communication link can be based on a TCP (Transmission Control Protocol) protocol and/or a UDP (User Datagram Protocol) protocol. The communication network can be the Internet.

The video data can be transmitted as a video stream over the communication network. The video data can be compressed using the video codec, e.g. MPEG-4, ITU-T H.264, or ITU-T H.265. The video data can be transmitted to the client over the communication network using an audio and/or video streaming protocol, e.g. MPEG-TS or MPEG-DASH.

The detector can be configured to detect the change associated with the graphical user interface element within the graphical user interface before the graphical user interface element is copied to the framebuffer of the server. The detector can be configured to prevent a rendering of the element text in the framebuffer of the server and/or to disable a copying of the rendered element text into the framebuffer of the server. Thus, the detector can be configured to intercept a rendering of the element text by the server before the element text is copied to the framebuffer of the server.

In a first implementation form of the server according to the first aspect as such, the graphical user interface further comprises a video element, the video element being represented by further video data, wherein the communication interface is configured to separately transmit the further video data, the video data and the element text data over the communication network. Thus, a video element of the graphical user interface can be provided to the client.

In a second implementation form of the server according to the first aspect as such or any preceding implementation form of the first aspect, the video data comprises a first timing indicator indicating a validity time of the video data, and the element text data comprises a second timing indicator indicating a validity time of the element text data. Thus, a synchronization of the video data and the element text data in time can be achieved at the client.

The first timing indicator or the second timing indicator can comprise a timestamp. The first timing indicator or the second timing indicator can indicate a validity time being represented as a date, an hour, a minute, a second, and/or a millisecond. The first timing indicator of the video data can be part of MPEG metadata. The second timing indicator of the element text data can be defined by a markup language, e.g. a time text markup language.

In a third implementation form of the server according to the first aspect as such or any preceding implementation form of the first aspect, the encoder is configured to generate a number of video frames upon the basis of the element shape data for encoding the element shape data into the video data, the number of video frames being arranged to form the video data. Thus, the element shape data can be encoded efficiently. An efficient encoding can be realized since the element text data may not be part of the video data.

In a fourth implementation form of the server according to the first aspect as such or any preceding implementation form of the first aspect, the server comprises a text encoder being configured to encode the element text into plain text data and layout data, the layout data indicating a text size, a text font, or a text path of the element text within the graphical user interface element, the plain text data and the layout data forming the element text data. Thus, the element text can be encoded efficiently.

The text encoder can be configured to encode the element text into plain text data and layout data upon the basis of a vector graphics format or a vector graphics representation. The text encoder can be configured to encode the element text into plain text data and layout data according to an Open Vector Graphics (OpenVG) specification, a Scalable Vector Graphics (SVG) specification, a Cascading Style Sheets (CSS) specification, or a Postscript (PS) specification.

The element text data formed by the plain text data and the layout data can be transmitted to the client over the communication network as a data stream, e.g. using a data streaming protocol.

The detector can be configured to intercept and/or to interpret the element text with regard to the plain text data and/or the layout data upon the basis of the vector graphics format or the vector graphics representation. The detector can be configured to intercept and/or to interpret the element text with regard to the plain text data and/or the layout data according to the Open Vector Graphics (OpenVG) specification, the Scalable Vector Graphics (SVG) specification, the Cascading Style Sheets (CSS) specification, or the Postscript (PS) specification.

In a fifth implementation form of the server according to the first aspect as such or the first implementation form to the fourth implementation form of the first aspect, the server comprises an image encoder being configured to encode the element text into image data, the image data representing an image of the element text of the graphical user interface element, the image data forming the element text data. Thus, the element text can be encoded efficiently.

The image encoder can be configured to encode the element text into image data using an LZ4 compression, a JPEG compression, a JPEG 2000 compression, a JPEG XR compression, a WebP compression, and/or an HEVC-MSP compression.

The element text data formed by the image data can be transmitted to the client over the communication network as a data stream, e.g. using a data streaming protocol. The element text data formed by the image data can comprise a suite of glyphs and/or a logo. The element text data formed by the image data may only comprise a logo.

The detector can be configured to intercept a rendering of the element text after it has been rendered on the server but before it may be copied to a framebuffer or virtual framebuffer. The framebuffer or virtual framebuffer can reflect a display capability of the client, wherein a size and/or a color depth can be different compared to the server. The element text can be decompressed and copied directly to a framebuffer of the client without using any font engine in the client.

The detector can be configured to intercept and/or to interpret the element text detected by the detector with regard to the plain text data, the layout data, and/or the image data. The plain text data, the layout data, and/or the image data can form the element text data.

In a sixth implementation form of the server according to the first aspect as such or any preceding implementation form of the first aspect, the element text data indicates a position, an orientation, or a movement of the element text relative to the element shape of the graphical user interface element. Thus, a relative arrangement or movement between the element text and the element shape can be indicated efficiently.

In a seventh implementation form of the server according to the first aspect as such or any preceding implementation form of the first aspect, the communication interface is configured to receive a request signal requesting a change associated with the graphical user interface element within the graphical user interface, and wherein the communication interface is configured to separately transmit the video data and the element text data over the communication network upon reception of the request signal. Thus, an update of the graphical user interface element can be performed upon reception of the request signal.

The request signal can indicate a user event at the client. The user event can be an input of the user and/or a keystroke of the user at the client. The request signal can further relate to an application event or a system event at the server which can have incidence to a rendered element text at the client.

In an eighth implementation form of the server according to the first aspect as such or any preceding implementation form of the first aspect, the graphical user interface element comprises a window element, a text box element, a button element, an icon element, a list box element, a menu element, or a carousel menu element. Thus, a standardized element shape of the graphical user interface element can be employed. The graphical user interface element can be represented in a two-dimensional (2D) and/or a three-dimensional (3D) representation.

In a ninth implementation form of the server according to the first aspect as such or any preceding implementation form of the first aspect, the change associated with the graphical user interface element comprises a rearrangement of the graphical user interface element within the graphical user interface, a scaling of the graphical user interface element within the graphical user interface, or a modification of the element text of the graphical user interface element within the graphical user interface. Thus, the change associated with the graphical user interface element can be detected efficiently. The modification of the element text can comprise a refresh of the element text and/or an update of the element text.

The change associated with the graphical user interface element can relate to a change associated with the element text and/or the element shape.

The change associated with the element text can relate to a change of plain text data and/or layout data e.g. indicating a text size, a text font, a text path, a text brush, a text pixel color, or a transparency to be used for drawing the text. The change associated with the element text can further relate to a rendered element text, or an image of the element text. The change associated with the element shape can relate to semantic information, e.g. a translation from a point A to a point B, indicating the change in the element shape comprising the element text.

According to a second aspect, the invention relates to a client for retrieving a graphical user interface from a server over a communication network, the graphical user interface comprising a graphical user interface element, the graphical user interface element being formed by an element shape and an element text, the element shape being represented by element shape data, the element text being represented by element text data, the client comprising a communication interface being configured to separately receive video data and the element text data over the communication network, the element shape data being encoded into the video data, and a combiner being configured to combine the video data with the element text data for retrieving the graphical user interface from the server. Thus, an efficient concept for providing a graphical user interface from a server to a client over a communication network can be realized. The client can be a thin-client or a zero-client.

The communication interface can be configured to establish a communication link between the server and the client over the communication network. The communication link can be based on a TCP (Transmission Control Protocol) protocol and/or a UDP (User Datagram Protocol) protocol. The communication network can be the Internet.

The combiner can be configured to generate a video layer upon the basis of the video data, to generate a text layer upon the basis of the element text data, and to merge the video layer with the text layer for combining the video data with the element text data. The combiner can be configured to combine the video data with the element text data within a framebuffer of the client.

In a first implementation form of the client according to the second aspect as such, the graphical user interface further comprises a video element, the video element being represented by further video data, wherein the communication interface is configured to separately receive the further video data, the video data and the element text data over the communication network, and wherein the combiner is configured to combine the further video data with the video data and the element text data. Thus, a video element of the graphical user interface can be provided to the client.

The combiner can be configured to generate a video layer upon the basis of the video data, to generate a further video layer upon the basis of the further video data, to generate a text layer upon the basis of the element text data, and to merge the video layer with the further video layer and the text layer for combining the further video data with the video data and the element text data.

In a second implementation form of the client according to the second aspect as such or any preceding implementation form of the second aspect, the video data comprises a first timing indicator indicating a validity time of the video data, and the element text data comprises a second timing indicator indicating a validity time of the element text data, wherein the client comprises a synchronizer being configured to synchronize the video data with the element text data in time upon the basis of the first timing indicator and the second timing indicator, and wherein the combiner is configured to combine the video data with the element text data upon synchronization of the video data with the element text data. Thus, a synchronization of the video data and the element text data in time can be achieved.

The synchronizer can be configured to compare the first timing indicator with the second timing indicator in order to determine a timing offset between the element text data and the video data.

In a third implementation form of the client according to the second aspect as such or any preceding implementation form of the second aspect, the client comprises a detector being configured to detect a request for a change associated with the graphical user interface element within the graphical user interface to obtain a request signal, and wherein the communication interface is configured to transmit the request signal over the communication network upon detection of the request for the change associated with the graphical user interface element. Thus, an update of the graphical user interface element can be initiated upon detection of a change associated with the graphical user interface element.

The detector can be configured to detect the change associated with the graphical user interface element by monitoring events at the client.

The request signal can indicate a user event at the client. The user event can be an input of the user and/or a keystroke of the user at the client. The request signal can further relate to an application event or a system event at the server which can have incidence to a rendered element text at the client.

According to a third aspect, the invention relates to a method for providing a graphical user interface to a client over a communication network, the graphical user interface comprising a graphical user interface element, the graphical user interface element being formed by an element shape and an element text, the element shape being represented by element shape data, the element text being represented by element text data, the method comprising encoding the element shape data into video data, detecting a change associated with the graphical user interface element within the graphical user interface, and separately transmitting the video data and the element text data over the communication network, the element text data being transmitted upon detection of the change associated with the graphical user interface element for providing the graphical user interface to the client. Thus, an efficient concept for providing a graphical user interface from a server to a client over a communication network can be realized.

The method can be performed by the server. Further features of the method can directly result from the functionality of the server.

The method can further comprise detecting a change associated with the graphical user interface element within the graphical user interface, and determining whether an affected portion of the graphical user interface comprises the text element. If this is the case, the element text can be intercepted. If this is not the case, the graphical user interface element can be captured and/or the framebuffer can be grabbed. The method can further comprise encoding the element shape data into video data, and separately transmitting the video data and the element text data over the communication network, the element text data being transmitted upon detection of the change associated with the graphical user interface element for providing the graphical user interface to the client.

In a first implementation form of the method according to the third aspect as such, the graphical user interface further comprises a video element, the video element being represented by further video data, wherein the method comprises separately transmitting the further video data, the video data and the element text data over the communication network. Thus, a video element of the graphical user interface can be provided to the client.

In a second implementation form of the method according to the third aspect as such or any preceding implementation form of the third aspect, the video data comprises a first timing indicator indicating a validity time of the video data, and the element text data comprises a second timing indicator indicating a validity time of the element text data. Thus, a synchronization of the video data and the element text data in time can be achieved at the client.

In a third implementation form of the method according to the third aspect as such or any preceding implementation form of the third aspect, the method comprises generating a number of video frames upon the basis of the element shape data for encoding the element shape data into the video data, the number of video frames being arranged to form the video data. Thus, the element shape data can be encoded efficiently.

In a fourth implementation form of the method according to the third aspect as such or any preceding implementation form of the third aspect, the method comprises encoding the element text into plain text data and layout data, the layout data indicating a text size, a text font, or a text path of the element text within the graphical user interface element, the plain text data and the layout data forming the element text data. Thus, the element text can be encoded efficiently.

In a fifth implementation form of the method according to the third aspect as such or the first implementation form to the fourth implementation form of the third aspect, the method comprises encoding the element text into image data, the image data representing an image of the element text of the graphical user interface element, the image data forming the element text data. Thus, the element text can be encoded efficiently.

In a sixth implementation form of the method according to the third aspect as such or any preceding implementation form of the third aspect, the element text data indicates a position, an orientation, or a movement of the element text relative to the element shape of the graphical user interface element. Thus, a relative arrangement or movement between the element text and the element shape can be indicated efficiently.

In a seventh implementation form of the method according to the third aspect as such or any preceding implementation form of the third aspect, the method comprises receiving a request signal requesting a change associated with the graphical user interface element within the graphical user interface, and separately transmitting the video data and the element text data over the communication network upon reception of the request signal. Thus, an update of the graphical user interface element can be performed upon reception of the request signal.

In an eighth implementation form of the method according to the third aspect as such or any preceding implementation form of the third aspect, the graphical user interface element comprises a window element, a text box element, a button element, an icon element, a list box element, a menu element, or a carousel menu element. Thus, a standardized element shape of the graphical user interface element can be employed.

In a ninth implementation form of the method according to the third aspect as such or any preceding implementation form of the third aspect, the change associated with the graphical user interface element comprises a rearrangement of the graphical user interface element within the graphical user interface, a scaling of the graphical user interface element within the graphical user interface, or a modification of the element text of the graphical user interface element within the graphical user interface. Thus, the change associated with the graphical user interface element can be detected efficiently.

According to a fourth aspect, the invention relates to a method for retrieving a graphical user interface from a server over a communication network, the graphical user interface comprising a graphical user interface element, the graphical user interface element being formed by an element shape and an element text, the element shape being represented by element shape data, the element text being represented by element text data, the method comprising separately receiving video data and the element text data over the communication network, the element shape data being encoded into the video data, and combining the video data with the element text data for retrieving the graphical user interface from the server. Thus, an efficient concept for providing a graphical user interface from a server to a client over a communication network can be realized.

The method can be performed by the client. Further features of the method can directly result from the functionality of the client.

In a first implementation form of the method according to the fourth aspect as such, the graphical user interface further comprises a video element, the video element being represented by further video data, wherein the method comprises separately receiving the further video data, the video data and the element text data over the communication network, and combining the further video data with the video data and the element text data. Thus, a video element of the graphical user interface can be provided to the client.

In a second implementation form of the method according to the fourth aspect as such or any preceding implementation form of the fourth aspect, the video data comprises a first timing indicator indicating a validity time of the video data, and the element text data comprises a second timing indicator indicating a validity time of the element text data, wherein the method comprises synchronizing the video data with the element text data in time upon the basis of the first timing indicator and the second timing indicator, and combining the video data with the element text data upon synchronization of the video data with the element text data. Thus, a synchronization of the video data and the element text data in time can be achieved.

In a third implementation form of the method according to the fourth aspect as such or any preceding implementation form of the fourth aspect, the method comprises detecting a request for a change associated with the graphical user interface element within the graphical user interface to obtain a request signal, and transmitting the request signal over the communication network upon detection of the request for the change associated with the graphical user interface element. Thus, an update of the graphical user interface element can be initiated upon detection of a change associated with the graphical user interface element.

According to a fifth aspect, the invention relates to a computer program comprising a program code for performing the method of the third aspect as such, any implementation form of the third aspect, the fourth aspect as such, or any implementation form of the fourth aspect when executed on a computer. Thus, the methods can be performed in an automatic and repeatable manner. The server and the client can be programmably arranged to perform the computer program.

Embodiments of the present invention can be implemented in hardware and/or software.

BRIEF DESCRIPTION OF THE DRAWINGS

Embodiments of the invention will be described with respect to the following figures, in which.

DETAILED DESCRIPTION

Figure 1:
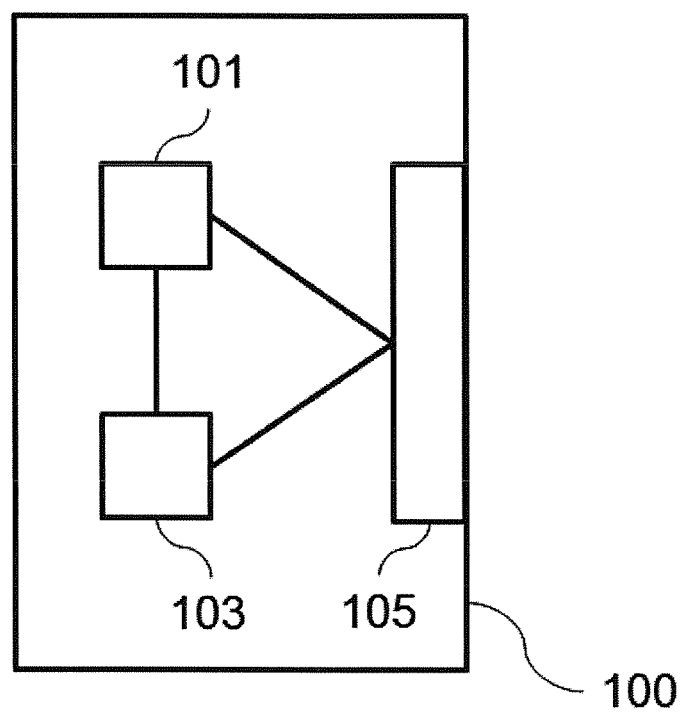
FIG. 1 shows a diagram of a server for providing a graphical user interface to a client over a communication network according to an embodiment.

FIG. 1 shows a diagram of a server 100 for providing a graphical user interface to a client over a communication network according to an embodiment. The graphical user interface comprises a graphical user interface element. The graphical user interface element is formed by an element shape and an element text. The element shape is represented by element shape data. The element text is represented by element text data.

The server 100 comprises an encoder 101 being configured to encode the element shape data into video data, a detector 103 being configured to detect a change associated with the graphical user interface element within the graphical user interface, and a communication interface 105 being configured to separately transmit the video data and the element text data over the communication network, the element text data being transmitted upon detection of the change associated with the graphical user interface element for providing the graphical user interface to the client.

The server 100 can further comprise a text encoder being configured to encode the element text into plain text data and layout data, the layout data indicating a text size, a text font, or a text path of the element text within the graphical user interface element, wherein the plain text data and the layout data form the element text data.

The server 100 can further comprise an image encoder being configured to encode the element text into image data, the image data representing an image of the element text of the graphical user interface element, wherein the image data forms the element text data.

Figure 2:
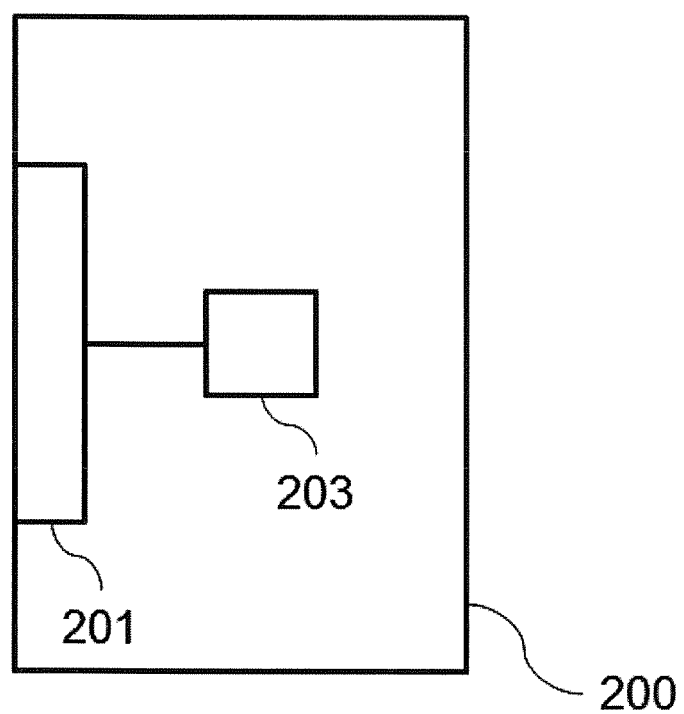
FIG. 2 shows a diagram of a client for retrieving a graphical user interface from a server over a communication network according to an embodiment.

FIG. 2 shows a diagram of a client 200 for retrieving a graphical user interface from a server over a communication network according to an embodiment. The graphical user interface comprises a graphical user interface element. The graphical user interface element is formed by an element shape and an element text. The element shape is represented by element shape data. The element text is represented by element text data.

The client 200 comprises a communication interface 201 being configured to separately receive video data and the element text data over the communication network, the element shape data being encoded into the video data, and a combiner 203 being configured to combine the video data with the element text data for retrieving the graphical user interface from the server.

The video data can comprise a first timing indicator indicating a validity time of the video data, and the element text data can comprise a second timing indicator indicating a validity time of the element text data. The client 200 can further comprise a synchronizer being configured to synchronize the video data with the element text data in time upon the basis of the first timing indicator and the second timing indicator. The combiner 203 can be configured to combine the video data with the element text data upon synchronization of the video data with the element text data.

The client 200 can further comprise a detector being configured to detect a request for a change associated with the graphical user interface element within the graphical user interface to obtain a request signal. The communication interface 201 can be configured to transmit the request signal over the communication network upon detection of the request for the change associated with the graphical user interface element.

Figure 3:
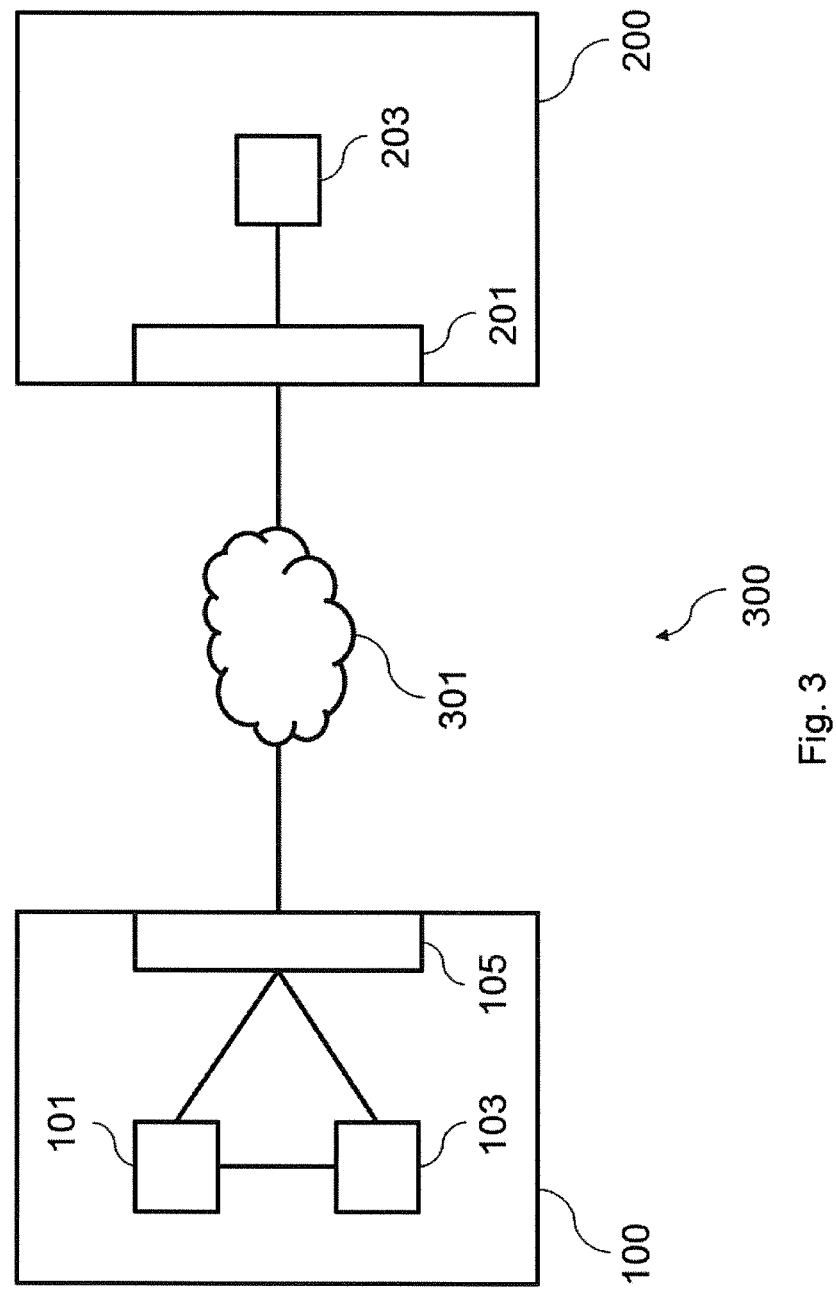
FIG. 3 shows a diagram of a communication system for providing a graphical user interface by a server to a client over a communication network according to an embodiment.

FIG. 3 shows a diagram of a communication system 300 for providing a graphical user interface by a server 100 to a client 200 over a communication network 301 according to an embodiment. The graphical user interface comprises a graphical user interface element. The graphical user interface element is formed by an element shape and an element text. The element shape is represented by element shape data. The element text is represented by element text data. The server 100 forms a possible implementation of the server 100 as described in conjunction with FIG. 1. The client 200 forms a possible implementation of the client 200 as described in conjunction with FIG. 2.

The server 100 comprises an encoder 101 being configured to encode the element shape data into video data, a detector 103 being configured to detect a change associated with the graphical user interface element within the graphical user interface, and a communication interface 105 being configured to separately transmit the video data and the element text data over the communication network 301, the element text data being transmitted upon detection of the change associated with the graphical user interface element for providing the graphical user interface to the client 200.

The client 200 comprises a communication interface 201 being configured to separately receive video data and the element text data over the communication network 301, the element shape data being encoded into the video data, and a combiner 203 being configured to combine the video data with the element text data for retrieving the graphical user interface from the server 100.

A communication link between the server 100 and the client 200 is established over the communication network 301. The communication network 301 can be the Internet.

Figure 4:
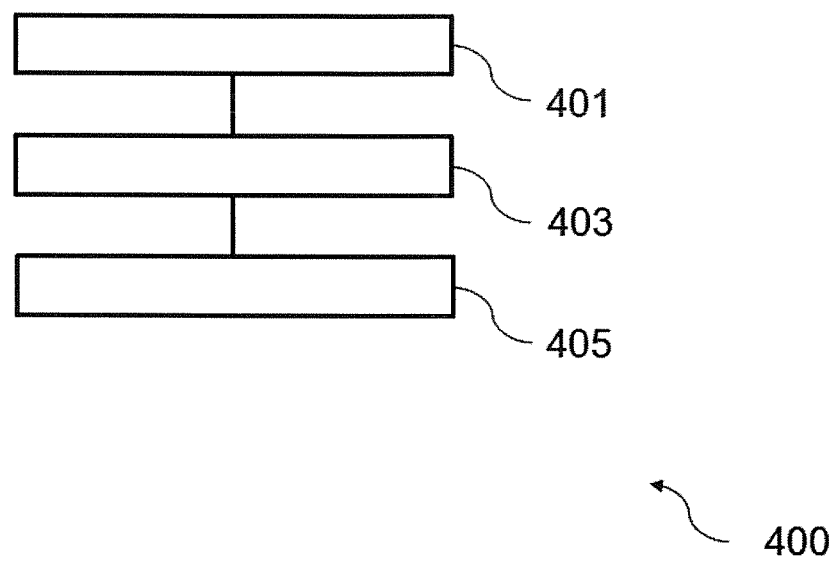
FIG. 4 shows a diagram of a method for providing a graphical user interface to a client over a communication network according to an embodiment.

FIG. 4 shows a diagram of a method 400 for providing a graphical user interface to a client over a communication network according to an embodiment. The graphical user interface comprises a graphical user interface element. The graphical user interface element is formed by an element shape and an element text. The element shape is represented by element shape data. The element text is represented by element text data.

The method 400 comprises encoding 401 the element shape data into video data, detecting 403 a change associated with the graphical user interface element within the graphical user interface, and separately transmitting 405 the video data and the element text data over the communication network, the element text data being transmitted upon detection of the change associated with the graphical user interface element for providing the graphical user interface to the client. The method 400 can be performed by any server according to an embodiment, e.g. the server 100.

Figure 5:
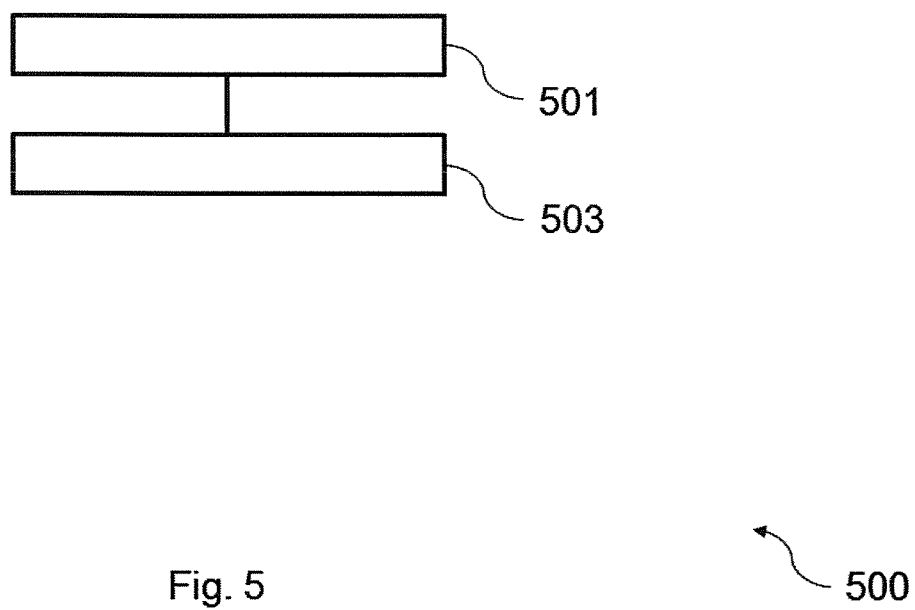
FIG. 5 shows a diagram of a method for retrieving a graphical user interface from a server over a communication network according to an embodiment.

FIG. 5 shows a diagram of a method 500 for retrieving a graphical user interface from a server over a communication network according to an embodiment. The graphical user interface comprises a graphical user interface element. The graphical user interface element is formed by an element shape and an element text. The element shape is represented by element shape data. The element text is represented by element text data.

The method 500 comprises separately receiving 501 video data and the element text data over the communication network, the element shape data being encoded into the video data, and combining 503 the video data with the element text data for retrieving the graphical user interface from the server. The method 500 can be performed by any client according to an embodiment, e.g. the client 200.

Figure 6:
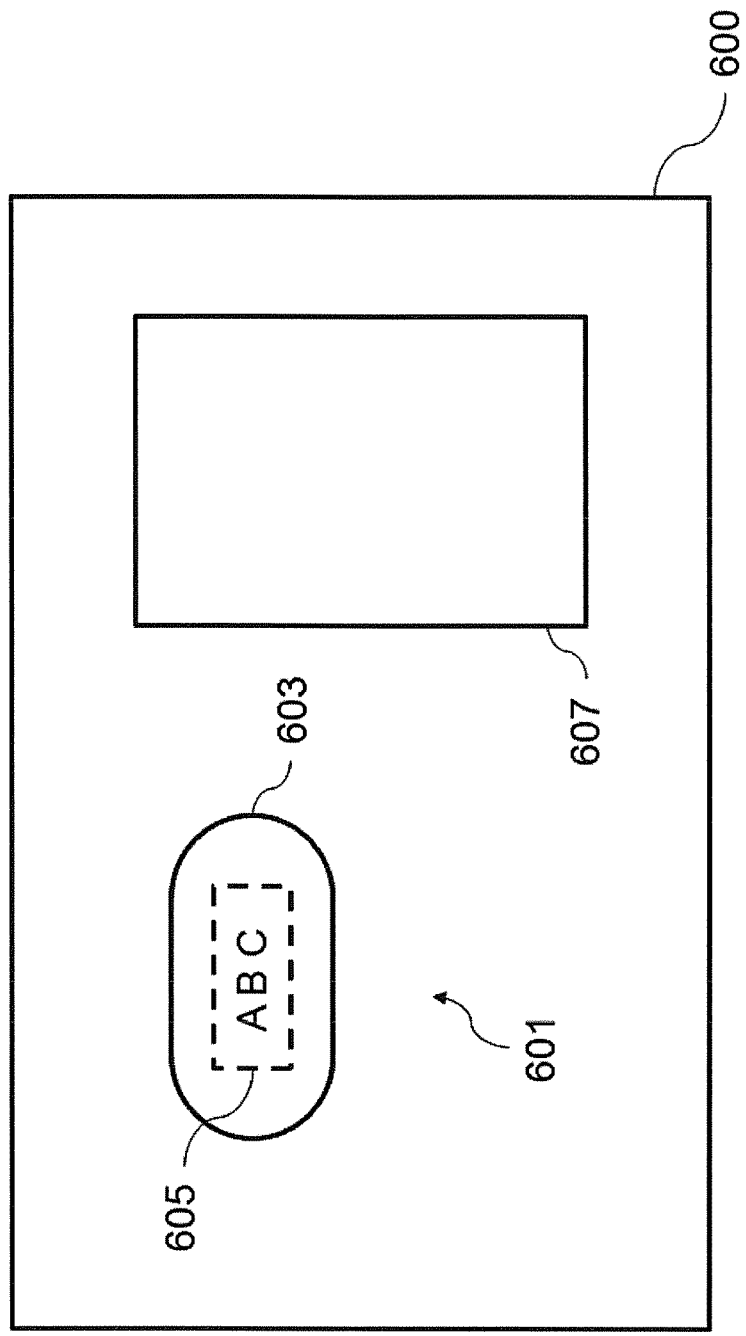
FIG. 6 shows a diagram of a graphical user interface according to an embodiment.

FIG. 6 shows a diagram of a graphical user interface 600 according to an embodiment. The graphical user interface 600 comprises a graphical user interface element 601. The graphical user interface element 601 is formed by an element shape 603 and an element text 605. The element shape 603 is represented by element shape data. The element text 605 is represented by element text data. The graphical user interface 600 further comprises a video element 607, wherein the video element 607 is represented by further video data.

The graphical user interface element 601 can comprise a window element, a text box element, a button element, an icon element, a list box element, a menu element, or a carousel menu element.

Figure 7:
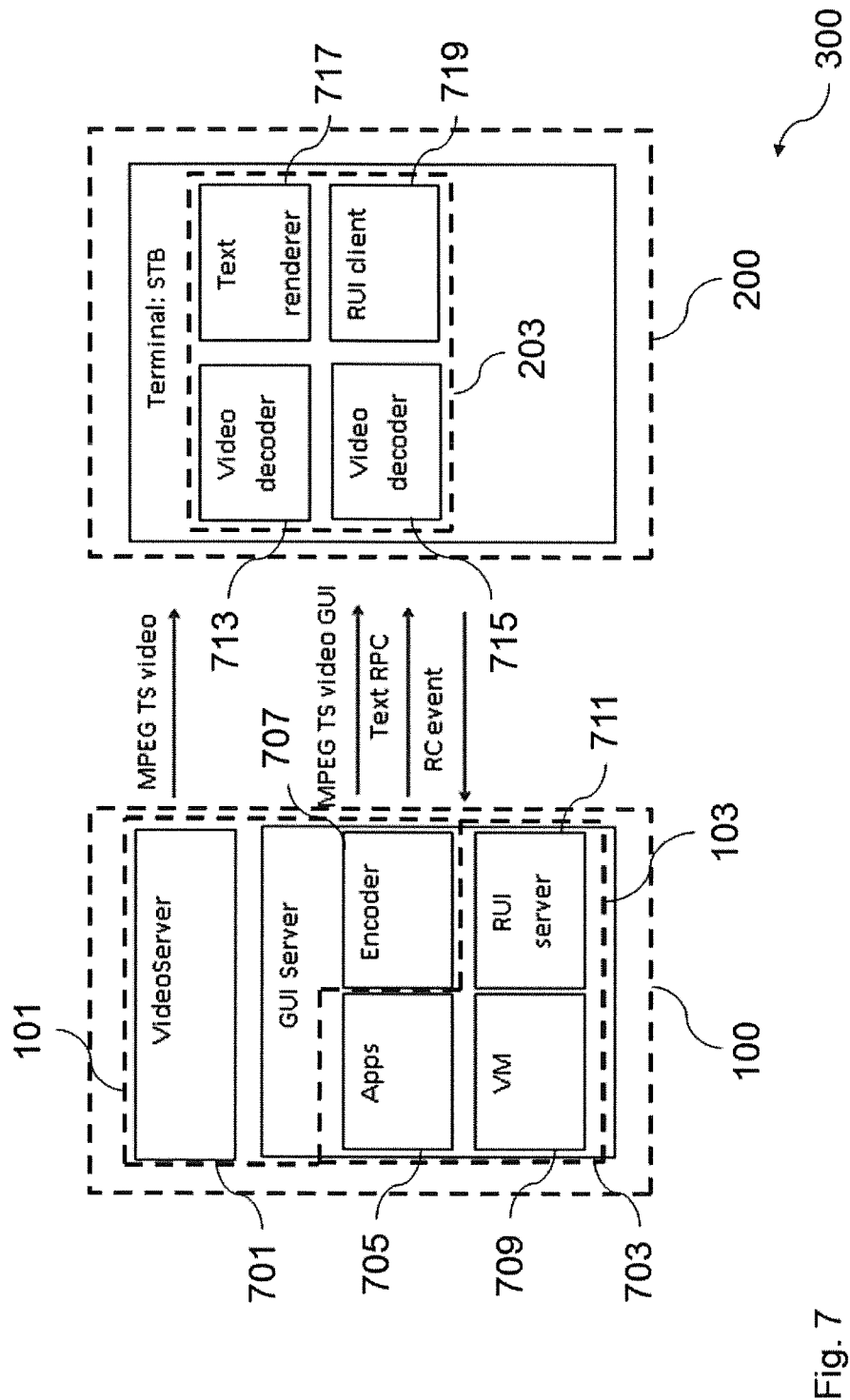
FIG. 7 shows a diagram of a communication system for providing a graphical user interface by a server to a client over a communication network according to an embodiment.

FIG. 7 shows a diagram of a communication system 300 for providing a graphical user interface by a server 100 to a client 200 over a communication network according to an embodiment. The server 100 comprises an encoder 101, and a detector 103. The communication interface 105 described in conjunction with FIG. 1 is not shown. The client 200 comprises a combiner 203. The communication interface 201 described in conjunction with FIG. 2 is not shown. The server 100 forms a possible implementation of the server 100 as described in conjunction with FIG. 1. The client 200 forms a possible implementation of the client 200 as described in conjunction with FIG. 2. The diagram shows functional building blocks of the communication system 300.

The server 100 comprises a video server 701, and a graphical user interface (GUI) server 703. The graphical user interface (GUI) server 703 executes an application 705, and comprises an encoder 707, a virtual machine (VM) 709, and a remote user interface (RUI) server 711. The encoder 101 can comprise the video server 701, and the encoder 707. The detector 103 can execute the application 705, and can comprise the virtual machine (VM) 709 and the remote user interface (RUI) server 711.

The encoder 101, e.g. the encoder 707, can provide video data representing the element shape of the graphical user interface element, e.g. using an MPEG TS video GUI stream. The encoder 101 can further provide further video data representing a video element of the graphical user interface, e.g. using an MPEG TS video stream. The detector 103, e.g. the remote user interface (RUI) server 711, can provide the element text data representing the element text of the graphical user interface element, e.g. using a text remote procedure call (RPC). The text remote procedure call (RPC) can initiate a rendering of the element text at the client 200.

The client 200 comprises a video decoder 713, a further video decoder 715, a text renderer 717, and a remote user interface (RUI) client 719. The combiner 203 can comprise the video decoder 713, the further video decoder 715, the text renderer 717, and the remote user interface (RUI) client 719. The client 200 can be a terminal or a set top box (STB). The communication interface of the client 200 can transmit a request signal, e.g. a remote call (RC) event indicator, to the server 100.

A hybrid approach which performs part of the rendering locally at the client 200 is the approach described in the following. A dual stream architecture, i.e. an architecture using further video data, e.g. a compressed audio video stream, for a video element, and video data, e.g. a compressed audio video stream, for the graphical user interface element, can be employed by adding a local rendering, e.g. based on using a graphics hardware accelerator, at the client 200.

The video data, e.g. the MPEG TS video GUI stream, may use a different codec than the further video data, e.g. the MPEG TS video stream, but may use a codec from the same codec family as it may be used for video PIP (Picture in Picture) and/or video PBP (Picture by Picture). This may be a functionality used by a majority of operators. Therefore, the codec can be reused by the video data, e.g. the MPEG TS video GUI stream, and it may be avoided to use further specific technologies at the client 200, e.g. a set top box (STB) system on a chip (SoC) for a decoding of the video data, e.g. the MPEG TS video GUI stream.

A menu fade-in and/or fade-out in a graphical user interface (GUI) is exemplary described in the following. There can be several options to improve a rendering of the graphical user interface on the client 200. Firstly, a calculation of a missing frame by interpolation can be applied. Secondly, a "moveto" information at the server 100, e.g.

from a graphical user interface (GUI) engine application programming interface (API), can be used to feed the encoder 101 and to bypass a motion estimation. These two approaches can be used to decrease the load of the server 100 but may maintain the video decoding mechanism which may not be matching pixel accurate, e.g. if it is based on an moving picture experts group (MPEG) based codec. Thirdly, a hardware blitter can be used to move a picture of a graphical user interface element, e.g. a menu, e.g. at 30 fps. The challenge can be that if this approach is regularly used, a full graphical user interface (GUI) rendering engine may be employed.

If the approach is used e.g. for a fade-in and/or fade-out, it may be desirable to detect the change associated with the graphical user interface element on the server 100, e.g. by the detector 103. In order to call a remote application programming interface (API) at the client 200, a local application programming interface (API) call may be intercepted, e.g. by the detector 103, but the semantics may be complex, e.g. copying a picture block from one location to another location. Using a graphical user interface (GUI) rendering engine at the server 100 to solve the limitations of a zero client technology may not work with a resource constraint server 100. Therefore, a full local graphical user interface (GUI) engine, e.g. in the combiner 203 of the client 200, may be used. The difference between video data, e.g. a graphical user interface (GUI) video stream, and further video data, e.g. a pure video stream, can be reduced in order to use a zero client technology in a hybrid mode.

The encoding bitrate, e.g. employed by the encoder 101, for the video data can be less than for the further video data. This can also relate to the encoding load on the server 100. In fact, this effect can result from a discrete cosine transform (DCT) quantification during encoding which can eliminate low frequency components. In a graphical user interface element, the element text can be removed which usually creates high frequency components. The combiner 203, e.g. a text renderer, at the client 200 may not provide full graphics capabilities.

From a general perspective, it can be analyzed in the server 100, e.g. by the detector 103, in which way an application, e.g. the application 705, generates the graphical user interface element and the graphical user interface can be split into basic graphical user interface elements in order to achieve a high performance rich graphical user interface with minimum processing load at the server 100 and the client 200. The performance in applications, e.g. in the application 705, which can provide graphical user interface elements can relate to both usability and responsiveness. High performance rich graphical user interfaces can provide appropriate, useful and intuitive displays as well as quick and smooth responses to user actions at the client 200.

In other words, the provision and/or rendering of the graphical user interface can be distributed between the server 100 and the client 200 using two mechanisms. One is related to using video data, e.g. an MPEG TS video GUI stream, for providing and/or rendering an easily to encode part of the graphical user interface element which can happen on the server 100. The other is related to using element text data, e.g. by the combiner 203, e.g. using a classic graphical user interface engine, for providing and/or rendering a pixel accurate part of the graphical user interface which can happen on the client 200.

One possible implementation of the local provision and/or rendering of the pixel accurate part of the graphical user interface at the client 200 can be based on a hardware acceleration mechanism on the client 200, and a vector graphics representation of the element text data in order to determine plain text data and layout data, e.g. indicating a text font, upon the basis of a vector graphics representation definition set used by the encoder 101. Vector graphics can be created from formulas used to define lines, shapes, and curves, wherein shapes can be edited by moving points called nodes or drawing points. Vector graphics may be scaled or resized to any resolution.

In more detail, the provision and/or rendering of the element text can be implemented using OpenVG (Open Vector Graphics) as a hardware acceleration technique by the client 200, e.g. by the combiner 203, and SVG (Scalable Vector Graphics), e.g. as defined by the W3C (World Wide Web Consortium), as a vector graphics representation. An EGL (Embedded System Graphics Library) native platform graphics interface is an interface portable layer for graphics resource management and can work between rendering application programming interfaces (APIs) such as OpenGL ES (Open Graphics Library for Embedded Systems) or OpenVG (Open Vector Graphics) and an underlying native platform GPU (Graphics Processing Unit). EGL (Embedded System Graphics Library) can be provided by various hardware manufacturers and can be embedded in chipsets. OpenVG (Open Vector Graphics) is a cross platform application programming interface (API), providing low level hardware acceleration interfaces for vector graphics libraries. The aforementioned application programming interfaces can be employed by the server 100 and/or the client 200.

In an embodiment, the element text data and/or the image data can be encoded in a W3C (World Wide Web Consortium) SVG (Scalable Vector Graphics) format and can be formatted according to a protocol which can manage the layout of the element text at the client 200, the communication between the server 100 and the client 200, orchestration and effects of the different graphical user interface elements being decoded by the client 200, e.g. by the combiner 203. For example, the following rich graphical user interface element effects can be used for the element text using OpenVG (Open Vector Graphics) with minimal processing at the server 100 and transferring the processing to the client 200 using hardware acceleration: anti-aliasing, as used for maps and navigation, path stroke and fill, outline fonts, stroke parameters, image effects, sample animations, and/or drawings.

For the element text, it can be assumed that an appropriate vector font can be cashed on the client 200, e.g. in the combiner 203. A W3C (World Wide Web Consortium) SVG (Scalable Vector Graphics) client, e.g. in the combiner 203 of the client 200, can provide and/or render the element text into an OpenVG (Open Vector Graphics) API (Application programming interface) using the vector font and can add a style layer, e.g. based on CSSs (Cascading Style Sheets), using the OpenVG (Open Vector Graphics) API (Application programming interface). The element text can be moved on a path using OpenVG (Open Vector Graphics) and hardware accelerated text and image fading effects can be used. Many other graphical user interface element effects, which can consume encoding resources on the server 100, e.g. the encoder 101, can be used if provided and/or rendered e.g. by a full zero client, such as paths, blending, filters, or alpha masking. In order to decrease the processing load of the server 100, such functions can be performed directly in the client 200 using hardware acceleration on the client 200, e.g. by the combiner 203.

Furthermore, CSSs (Cascading Style Sheets) can be used by the server 100 and/or the client 200. CSS is a style sheet language used for describing the look and formatting of a document written in a markup language. CSS can be designed to enable the separation of document content from document presentation, including elements such as the layout, colors, and fonts. By using the CSS language for providing and/or rendering the element text on the client 200, active rich graphical user interface text capabilities without encoding the element text data into image data can be achieved.

Moreover, if using SVG (Scalable Vector Graphics) within the W3C (World Wide Web Consortium) CSSs (Cascading Style Sheets), a standard layout markup language can be used which can be provided and/or rendered on the client 200 with a standard Internet browser, low CPU (Central Processing Unit) power, and with an appropriate hardware acceleration, e.g. using OpenVG (Open Vector Graphics). For example, specific components, e.g. within the combiner 203, can include OpenVG EGL (Open Vector Graphics for Embedded Systems) and a standard HTML5 (Hypertext Markup Language 5) Internet browser. Some components may, however, not provide enough CPU (Central Processing Unit) power to provide a rich graphical user interface experience when rendering using a high resolution. Using a standard SVG (Scalable Vector Graphics) and W3C (World Wide Web Consortium) markup language, it may be feasible to use standard of the shelf hardware and software at the client 200.

Figure 8:
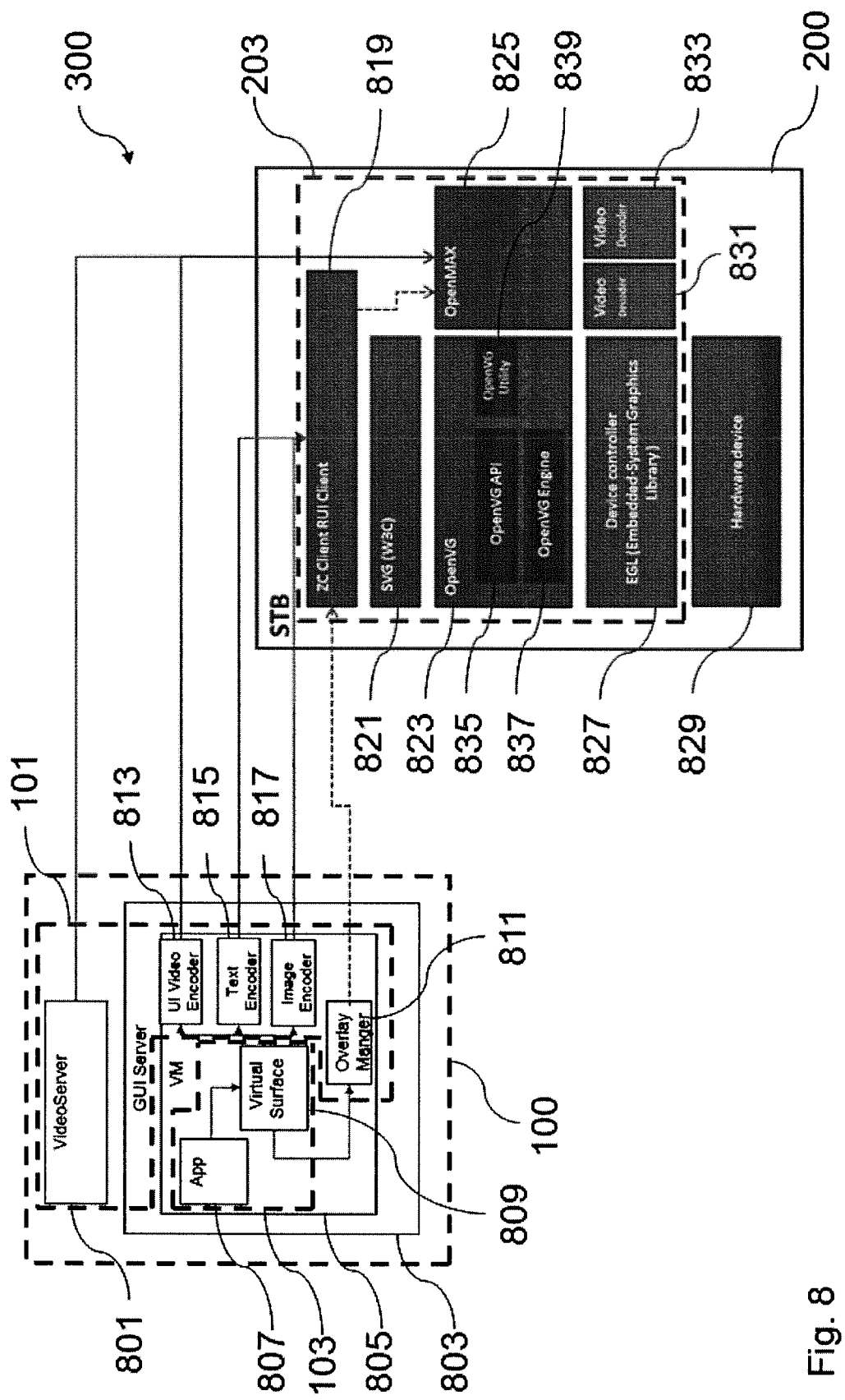
FIG. 8 shows a diagram of a communication system for providing a graphical user interface by a server to a client over a communication network according to an embodiment.

FIG. 8 shows a diagram of a communication system 300 for providing a graphical user interface by a server 100 to a client 200 over a communication network according to an embodiment. The server 100 comprises an encoder 101, and a detector 103. The communication interface 105 described in conjunction with FIG. 1 is not shown. The client 200 comprises a combiner 203. The communication interface 201 described in conjunction with FIG. 2 is not shown. The server 100 forms a possible implementation of the server 100 as described in conjunction with FIG. 1. The client 200 forms a possible implementation of the client 200 as described in conjunction with FIG. 2. The diagram shows more details of the functionality of elements described in FIG. 7 within the context of a possible implementation based on vector graphics.

The server 100 comprises a video server 801 and a graphical user interface (GUI) server 803. The graphical user interface (GUI) server 803 comprises a virtual machine (VM) 805. The virtual machine (VM) 805 executes an application 807. The virtual machine (VM) 805 comprises a virtual surface 809, an overlay manager 811, a user interface (UI) video encoder 813, a text encoder 815, and an image encoder 817. The encoder 101 can comprise the video server 801, the overlay manager 811, the user interface (UI) video encoder 813, the text encoder 815, and the image encoder 817. The detector 103 can execute the application 807, and can comprise the virtual surface 809. The virtual surface 809, which can be equivalent to a virtual framebuffer, is introduced. The virtual surface 809 or virtual framebuffer may represent a memory. The overlay manager 811 can be comprised by a remote user interface (RUI) server in charge of providing a specification on how video layers may be presented to a user at the client 200.

The client 200 can be a set top box (STB). The client 200 comprises a zero client (ZC) remote user interface (RUI) client 819, an SVG (W3C) module 821, an OpenVG module 823, an OpenMAX module 825, a device controller EGL (Embedded System Graphics Library) module 827, a video decoder 831, and a further video decoder 833. The client 200 can be realized as a hardware device 829. The OpenVG module 823 comprises an OpenVG API 835, an OpenVG engine 837, and an OpenVG utility module 839. The combiner 203 can comprise the zero client (ZC) remote user interface (RUI) client 819, the SVG (W3C) module 821, the OpenVG module 823, the OpenMAX module 825, the device controller EGL (Embedded System Graphics Library) module 827, the video decoder 831, the further video decoder 833, the OpenVG API 835, the OpenVG engine 837, and the OpenVG utility module 839.

The figure illustrates an end-to-end implementation of the system 300. In the server 100, e.g. the graphical user interface (GUI) server 803, the application 807 can paint into the virtual surface 809, e.g. realized as a virtual framebuffer of the server 100. The detector 103, e.g. the graphical user interface (GUI) server 803, can analyze the virtual framebuffer of the server 100, and can detect low frame rate elements, e.g. an element shape of a graphical user interface element, that can be encoded into video data, and high frame rate elements, e.g. an element text of a graphical user interface element, that can be encoded into element text data.

In addition, the server 100, e.g. the graphical user interface (GUI) server 803, can receive and/or detect an element text on a virtual screen, can get it as input directly from the application 807, and/or can detect the element text on the virtual screen. The element text may not be converted into video data. The element text can be transferred into an SVG (Scalable Vector Graphics) textual representation. By doing so, the server 100 may not encode the element text into video data and can allow the client 200 to use rich user experience effects that may not be possible using traditional zero client technologies. It can further allow these effects to be provided and/or rendered by a standard OpenVG hardware accelerator engine on the client 200.

Each of the graphical user interface elements on the virtual surface 809 can be provided and/or rendered with a different encoder, e.g. the user interface (UI) video encoder 813 and the text encoder 815, and can be sent to the client 200 using a container for this multi-codec user interface (UI) representation using a specific protocol. The specific protocol can manage the layout of the graphical user interface element on the client 200 and the communication between the server 100 and the client 200. The overlay data can be embedded using the same specific protocol or can be sent via a different communication channel.

The client 200 can input the different data into appropriate decoders of the combiner 203, e.g. the video decoder 831 and the further video decoder 833. In case, the element text data is formatted according to an SVG (Scalable Vector Graphics) representation, the combiner 203, e.g. the video decoder 831, can use an OpenMAX (Open Media Acceleration) decoder, and the element text can be provided and/or rendered using SVG (Scalable Vector Graphics) fonts. The SVG (Scalable Vector Graphics) module 821 can use an OpenVG (Open Vector Graphics) hardware accelerator to perform the decoding and painting of the graphical user interface element on a screen of the client 200, e.g. using a physical framebuffer.

By using the described approach, less processing power on the server 100 may be used while encoding the rich user interface and simple low power clients, e.g. the client 200 described in conjunction with FIG. 2, with a standard hardware accelerator can be used. The following example shows a standard SVG (Scalable Vector Graphics) and W3C (World Wide Web Consortium) markup language representation for an element text representation.

Exemplary Element Text Representation Using SVG (Scalable Vector Graphics) in XML (Extensible Markup Language):

```
<svg>
<text x="0" y="15">This is Scalable Vector Graphic (SVG)
Text</text>
</svg>
```

Examplary Element Text Representation Using HTML (Hypertext Markup Language):

```
<defs>
<path id="textpath" fill="none" stroke="#000000"
d="M0.057,0.024c0,0,10.99,51.603,102.248,51.603c91.259,0,
136.172,53.992,136.172,53.992"/>
</defs>
<use xlink:href="#textpath"/>
<text x="10" y="100">
<textPath xlink:href="#textpath">
Text </textPath>
</text>
```

These examples are not exclusive. A software text rendering engine based on CPU (Central Processing Unit) computing or a simple hardware accelerator, such as a blitter, may also be used. A position of a video element within the graphical user interface (GUI) can be determined upon the basis of a PIP (Picture in Picture) specification.

Figure 9:
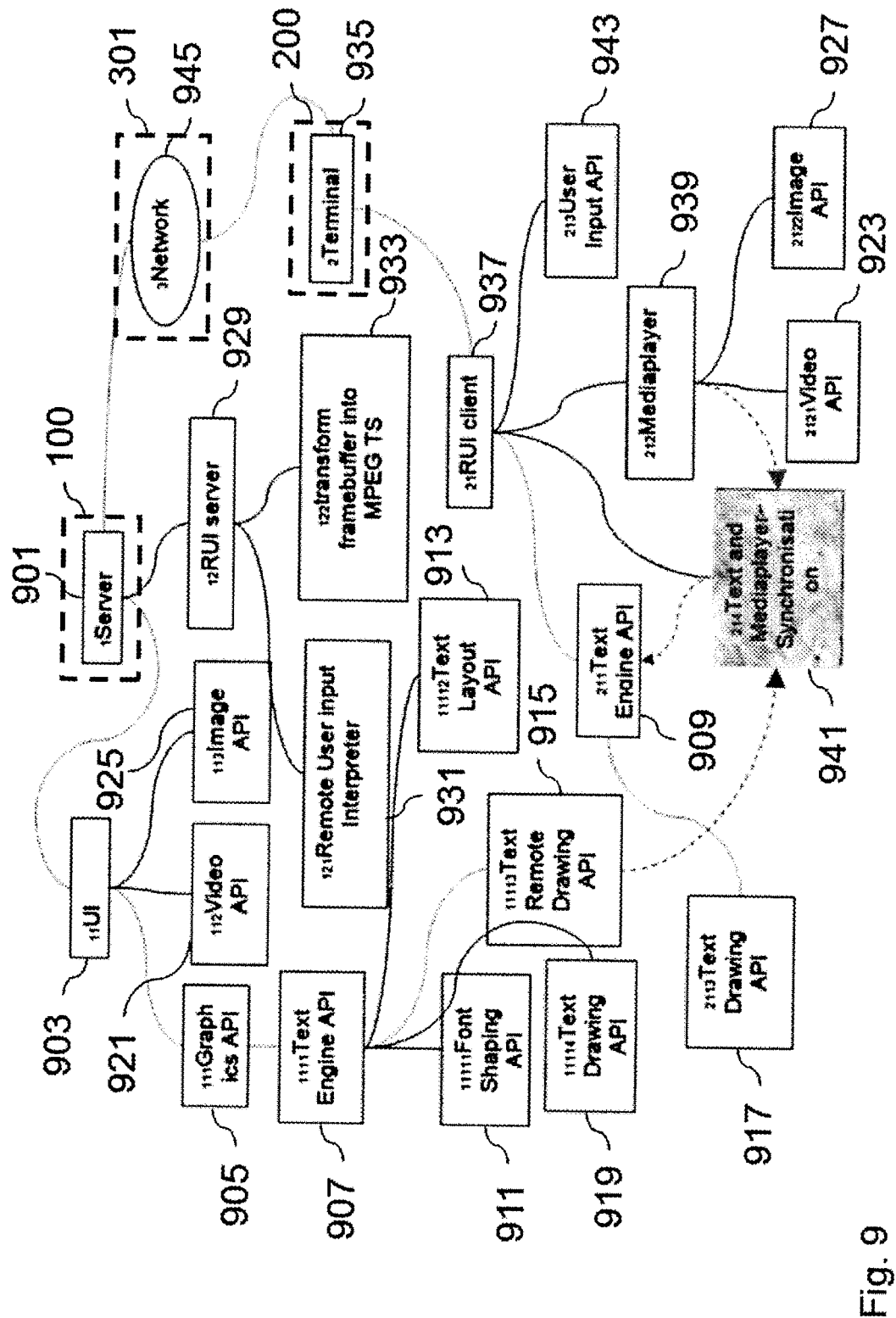
FIG. 9 shows a flow diagram of a provision of a graphical user interface by a server to a client over a communication network according to an embodiment.

FIG. 9 shows a flow diagram of a provision of a graphical user interface by a server 100 to a client 200 over a communication network 301 according to an embodiment. The flow diagram provides an overview of an end-to-end implementation of the system 300 as described in conjunction with FIG. 3. The server 100 forms a possible implementation of the server 100 as described in conjunction with FIG. 1. The client 200 forms a possible implementation of the client 200 as described in conjunction with FIG. 2. The graphical user interface can be provided by the server 100 to the client 200 upon the basis of procedure calls described in the following.

The flow diagram depicts a server 901, a user interface (UI) 903, a graphics application programming interface (API) 905, a text engine application programming interface (API) 907, a text engine application programming interface (API) 909, a font shaping application programming interface (API) 911, a text layout application programming interface (API) 913, a text remote drawing application programming interface (API) 915, a text drawing application programming interface (API) 917, a text drawing application programming interface (API) 919, a video application programming interface (API) 921, a video application programming interface (API) 923, an image application programming interface (API) 925, an image application programming interface (API) 927, a remote user interface (RUI) server 929, a remote user input interpreter 931, an MPEG TS transform framebuffer module 933, a terminal 935, an remote user interface (RUI) client 937, a mediaplayer 939, a text and mediaplayer synchronizer 941, a user input application programming interface (API) 943, and a network 945. The server 100 is represented by the server 901. The client 200 is represented by the terminal 935. The communication network 301 is represented by the network 945.

The server 100 can comprise the server 901 of an operator which can be a computer with an operating system capable to support a concurrent access of clients or terminals, e.g. the client 200 or the terminal 935.

The user interface (UI) 903 can represent a software module responsible to interact with a user by managing a user input event coming from an input device of the client 200, typically a remote control key press event, and to provide and/or render the corresponding display of the screen of the client 200, like for example an echo of a character of an input field into a form of the graphical user interface. The detector 103 described in conjunction with FIG. 1 can comprise the user interface (UI) 903.

The graphics application programming interface (API) 905 can represent the part of the software interface used to draw basic graphic primitives, such as a line or any geometric object that can be describe through a list of points and a mathematical model, e.g. a Bezian curve. The encoder 101 described in conjunction with FIG. 1 can comprise the graphics application programming interface (API) 905.

The text engine application programming interface (API) 907 and the text engine application programming interface (API) 909 can represent a text engine application programming interface (API) which can be a software interface used to compute the provision and/or rendering of the element text of a graphical user interface element on a screen of the client 200. The encoder 101 described in conjunction with FIG. 1 can comprise the text engine application programming interface (API) 907 and the text engine application programming interface (API) 909.

The font shaping application programming interface (API) 911 can be responsible to compute glyphs defined in a font definition of the element text into pixels. The font shaping can be cached in order to optimize the computing load. The encoder 101 described in conjunction with FIG. 1 can comprise the font shaping application programming interface (API) 911.

The text layout application programming interface (API) 913 can calculate a space between each character of words and sentences of a paragraph in order to match the display area of a screen and to avoid visual artefacts, like for example a character overlapping. The encoder 101 described in conjunction with FIG. 1 can comprise the text layout application programming interface (API) 913.

The text remote drawing application programming interface (API) 915 can be called by intercepting the text drawing application programming interface (API) 919 of the server 100. It can call the text drawing application programming interface (API) 917 of the client 200 through a remote procedure call (RPC) mechanism instead of the one of the server 100 and can then bypass the implementation of the text drawing application programming interface (API) 919 of the server 100. The text drawing application programming interface (API) 917 and the text drawing application programming interface (API) 919 can be responsible to copy the element text that has been rendered, e.g. in a memory, into the framebuffer, respectively, in the server 100 and in the client 200. The encoder 101 described in conjunction with FIG. 1 can comprise the text remote drawing application programming interface (API) 915 and the text drawing application programming interface (API) 919. The combiner 203 described in conjunction with FIG. 2 can comprise the text drawing application programming interface (API) 917.

The video application programming interface (API) 921 and the video application programming interface (API) 923 can represent parts of the software interface used to play a video from the video data or the further video data, such as a file containing a compressed audio video stream or an audio video stream coming from a network interface. The encoder 101 described in conjunction with FIG. 1 can comprise the video application programming interface (API)

921. The combiner 203 described in conjunction with FIG. 2 can comprise the video application programming interface (API) 923.

The image application programming interface (API) 925 and the image application programming interface (API) 927 can represent parts of the software interface used to provide and/or render a picture, e.g. a PNG or JPEG file. The encoder 101 described in conjunction with FIG. 1 can comprise the image application programming interface (API) 925. The combiner 203 described in conjunction with FIG. 2 can comprise the image application programming interface (API) 927.

The remote user interface (RUI) server 929 can represent parts of the software responsible to manage remote user events at the client 200 and to provide them to the server 100 like there occurred a local user event and to provide a copy of the framebuffer of the server 100, e.g. formatted as an RGB24 bitmap, without the element text rendered in it, to the client 200 in order to refresh it when it is desired, e.g. after a key press event. It can also be responsible to send the element text data to be displayed each time the element text shall be refreshed, e.g. by invalidating a region of a screen of the client 200 using an "InvalidateRect" or an "InvalidateRgn" function. It can use a bitmap format which can be cached into the client 200 if the client 200 is not able to handle it at a higher level, e.g. using a Draw_Text ("adc", Started at pixel (x,y), Using font_XYZ) call. The encoder 101 described in conjunction with FIG. 1 can comprise the remote user interface (RUI) server 929.

The remote user input interpreter 931 can represent a software module which listens to user events and can decide which sequence to process next. Typically, it can be employed to realize an echo of a character on a screen after a key press event. The encoder 101 described in conjunction with FIG. 1 can comprise the remote user input interpreter 931.

The MPEG TS transform framebuffer module 933 can represent a transformation of a framebuffer of the server 100 into an MPEG transport stream (TS). The server 100 can package the framebuffer into video data, e.g. using a video stream format, in order to be able to decode it like a video stream at the client 200. The encoder 101 described in conjunction with FIG. 1 can comprise the MPEG TS transform framebuffer module 933.

The client 200 can comprise the terminal 935 representing a terminal device of the user which can be a thin client computer, e.g. one of the clients 200 described in the foregoing.

The remote user interface (RUI) client 937 can be responsible to send to the server 100 an input event indicator, e.g. a request signal, from the client 200, and to receive a copy of the changes associated to the framebuffer. The combiner 203 described in conjunction with FIG. 2 can comprise the remote user interface (RUI) client 937.

The mediaplayer 939 can represent a software module being able to provide and/or render any multimedia content, e.g. audio, video, and/or pictures, at the client 200. The combiner 203 described in conjunction with FIG. 2 can comprise the mediaplayer 939.

The text and mediaplayer synchronizer 941 can represent a software module that can schedule a call to the text drawing application programming interface (API) 917 in order to respect the sequence of display changes on the client 200 like if they had been observed by a user on a screen of the server 100. In order to proceed, it can receive a user event indicator, e.g. a request signal, indicating that a framebuffer change is ready to be displayed by the mediaplayer 939, and/or a "text shall be refreshed" indicator coming from the text remote drawing application programming interface (API) 915. Then it can manage the call to the drawing of the element text by the text engine application programming interface (API) 909. The synchronizer described in conjunction with FIG. 2 can comprise the text and mediaplayer synchronizer 941.

The communication network 301 can comprise the network 945 indicating an operator network which can be an IP (Internet Protocol) network infrastructure. The network 945 can realize a transport of information between an operator service server, e.g. the server 100, and a home terminal of the user, e.g. the client 200.

Figure 10:
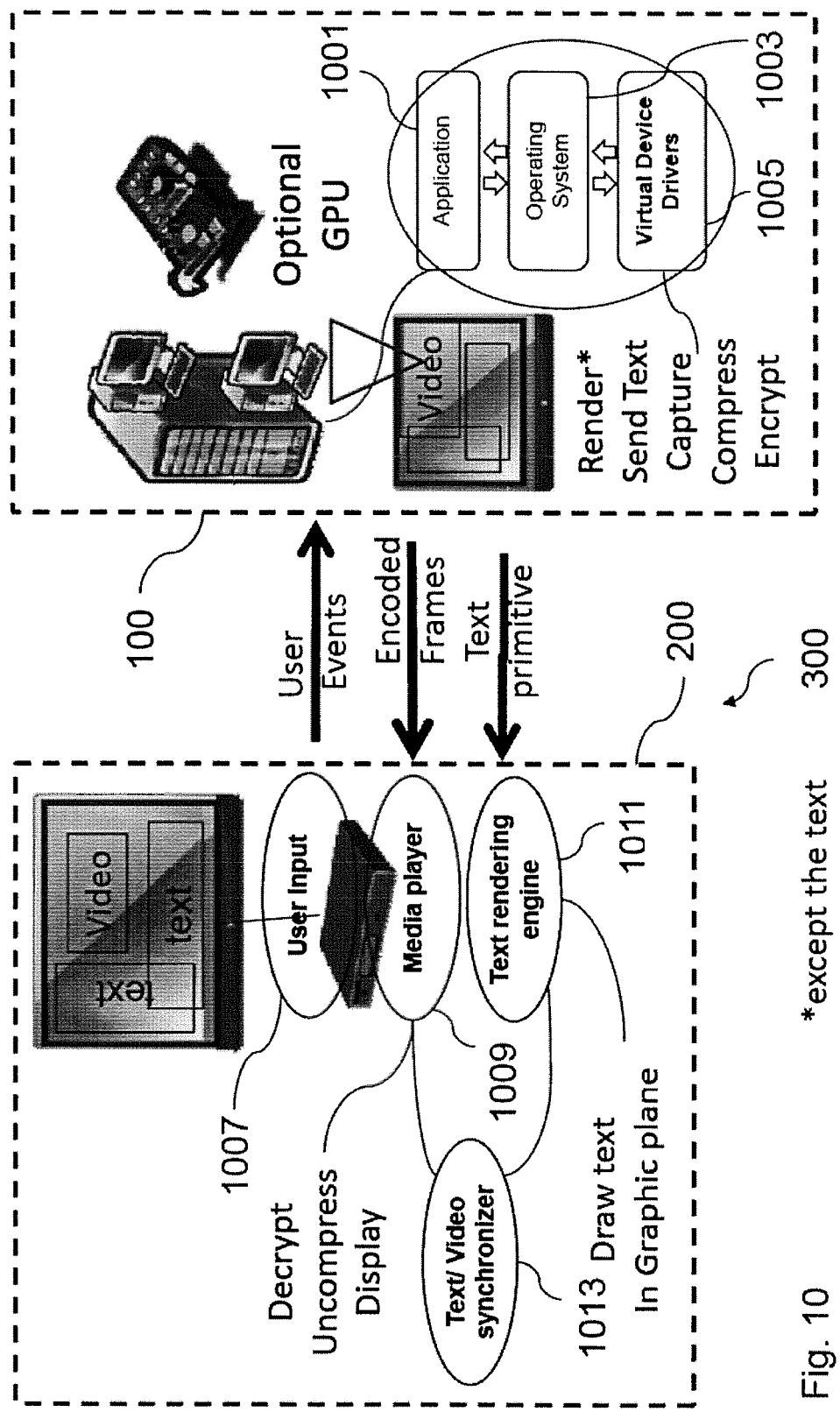
FIG. 10 shows a diagram of a communication system for providing a graphical user interface by a server to a client over a communication network according to an embodiment.

FIG. 10 shows a diagram of a communication system 300 for providing a graphical user interface by a server 100 to a client 200 over a communication network according to an embodiment. The server 100 forms a possible implementation of the server 100 as described in conjunction with FIG. 1. The client 200 forms a possible implementation of the client 200 as described in conjunction with FIG. 2.

The server 100 executes an application 1001, and comprises an operating system 1003, and a virtual device driver 1005. The server 100 can optionally comprise a GPU (Graphics Processing Unit). The virtual device driver 1005 can be configured to provide and/or render the graphical user interface element, except for the element text, to send the element text, to capture a video frame, to compress the video data, and to encrypt the video data. The server 100 can provide encoded video frames and element text primitives to the client 200, and can receive a user event indicator, e.g. a request signal, from the client 200.

The client 200 comprises a user input module 1007, a mediaplayer 1009, a text rendering engine 1011, and a text/video synchronizer 1013. The mediaplayer 1009 can be configured to decrypt the video data, to uncompress the video data, and to display the video, e.g. a video GUI stream and/or an audio video stream. The text rendering engine 1011 can be configured to draw the element text into a graphic layer. The user input module 1007 can provide a user event indicator, e.g. a request signal, to the server 100. The mediaplayer 1009 can receive encoded video frames from the server 100. The text tendering engine 1011 can receive element text primitives from the server 100.

Embodiments are based on the idea of using one communication path for the graphical user interface element and another communication path for further user interface types. The graphical user interface element can be processed in video data, except that the element text may not be rendered by the server 100 but by the client 200. Consequently, the encoding load, the data rate, and/or the bandwidth can be reduced for the same level of quality.

An implementation using SVG (Scalable Vector Graphics) and/or standard vector graphics hardware acceleration by the client 200 can be realized. Scalable vector graphics can be used as the representation layer for element text rendering, a text engine API, and an image rendering on the client 200. Scalable Vector Graphics (SVG) can be an XML-based vector image and text format for two-dimensional graphics that can provide support for interactivity and animation.

Standard OpenVG (Open Vector Graphics) can be used to accelerate the vector graphics rendering on the client 200. An EGL (Embedded-System Graphics Library) as a native platform graphics interface can be provided by hardware manufactures embedded in the chipsets. EGL (Embedded-System Graphics Library) can be an interface portable layer for graphics resource management and can work between rendering application programming interfaces (APIs), the OpenVG (Open Vector Graphics), and an underlying native platform GPU (Graphics Processing Unit), e.g. the EGL (Embedded-System Graphics Library). There can be an appropriate vector font cashed on the client 200.

The element text data and/or image data can be encode in the W3C (World Wide Web Consortium) SVG (Scalable Vector Graphics) format and can use a specific protocol on top to manage the overlaying, orchestration, and effects of the different decoding tasks on the client 200, e.g. for the element text and/or the video data. For example, the following effects can be realized for the element text using OpenVG (Open Vector Graphics): anti-aliasing, path stroke and fill, outline fonts, stroke parameters, image effects, animation, and/or drawing.

Figure 11:
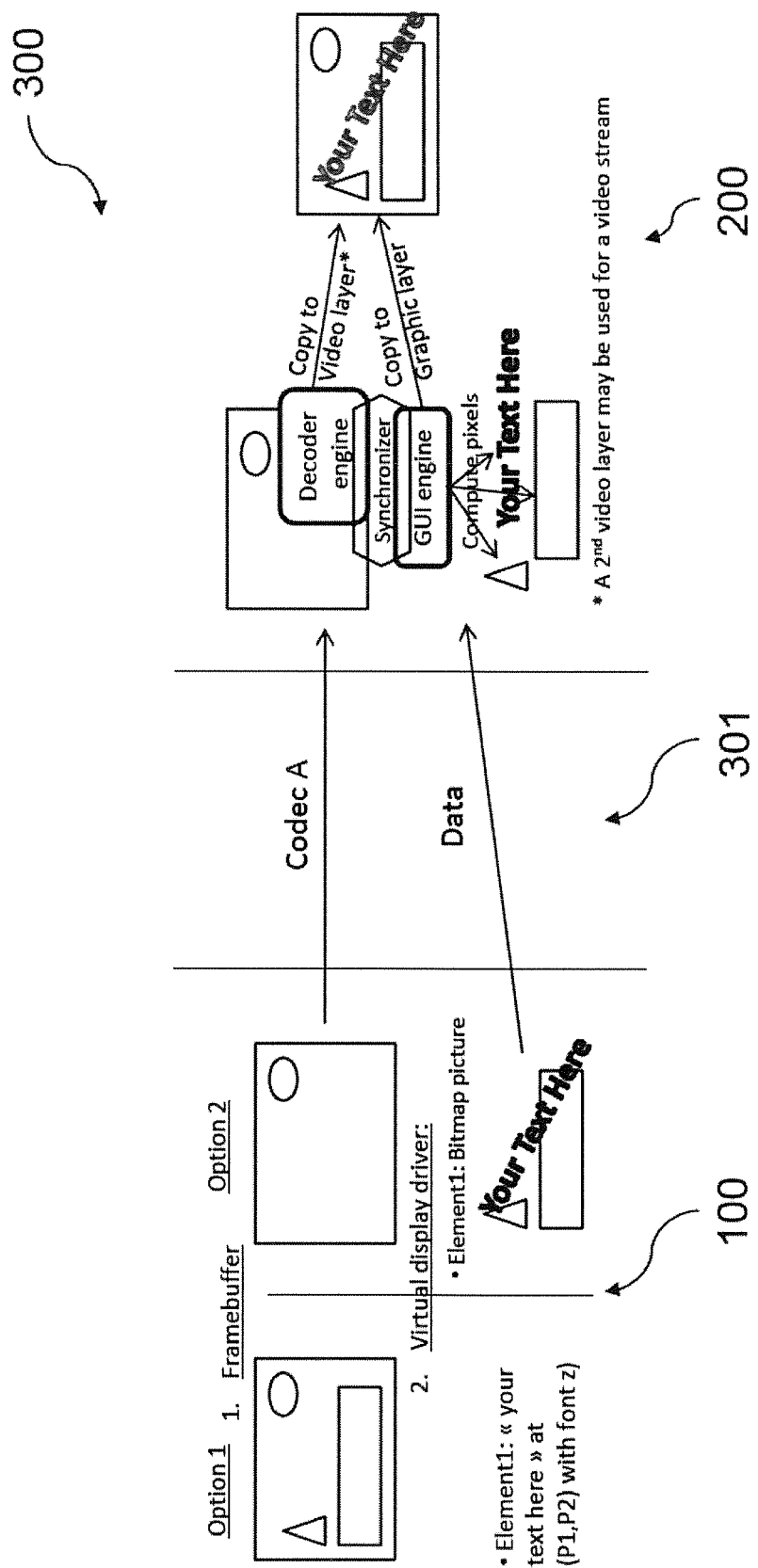
FIG. 11 shows a diagram of a communication system for providing a graphical user interface by a server to a client over a communication network according to an embodiment.

FIG. 11 shows a diagram of a communication system 300 for providing a graphical user interface by a server 100 to a client 200 over a communication network 301 according to an embodiment. The server 100 forms a possible implementation of the server 100 as described in conjunction with FIG. 1. The client 200 forms a possible implementation of the client 200 as described in conjunction with FIG. 2.

The server 100 can provide the graphical user interface element of the graphical user interface using different options. The first option is based on encoding the element text into plain text data and layout data. The element shape is arranged within a framebuffer of the server 100. The element text is indicated e.g. as "your text here" starting at point (P1, P2) with font z. The second option is based on encoding the element text into image data. The element shape is arranged within a framebuffer of the server 100. The element text is represented by an image, e.g. a bitmap picture, using a virtual display driver.

The element shape is encoded into video data which can be transmitted to the client 200 over the communication network 301 using a first codec. The element text data is transmitted to the client 200 over the communication network 301 in form of a data stream.

The client 200 comprises a decoder engine, a GUI engine, and a synchronizer, for combining the video data with the element text data. The decoder engine can copy the decoded video data to a video layer. A second video layer may be used for a video stream. The GUI engine can compute pixels related to the element text data and can copy the pixels to a graphic layer. The video layer and the graphic layer can be merged to provide the graphical user interface.

Figure 12:
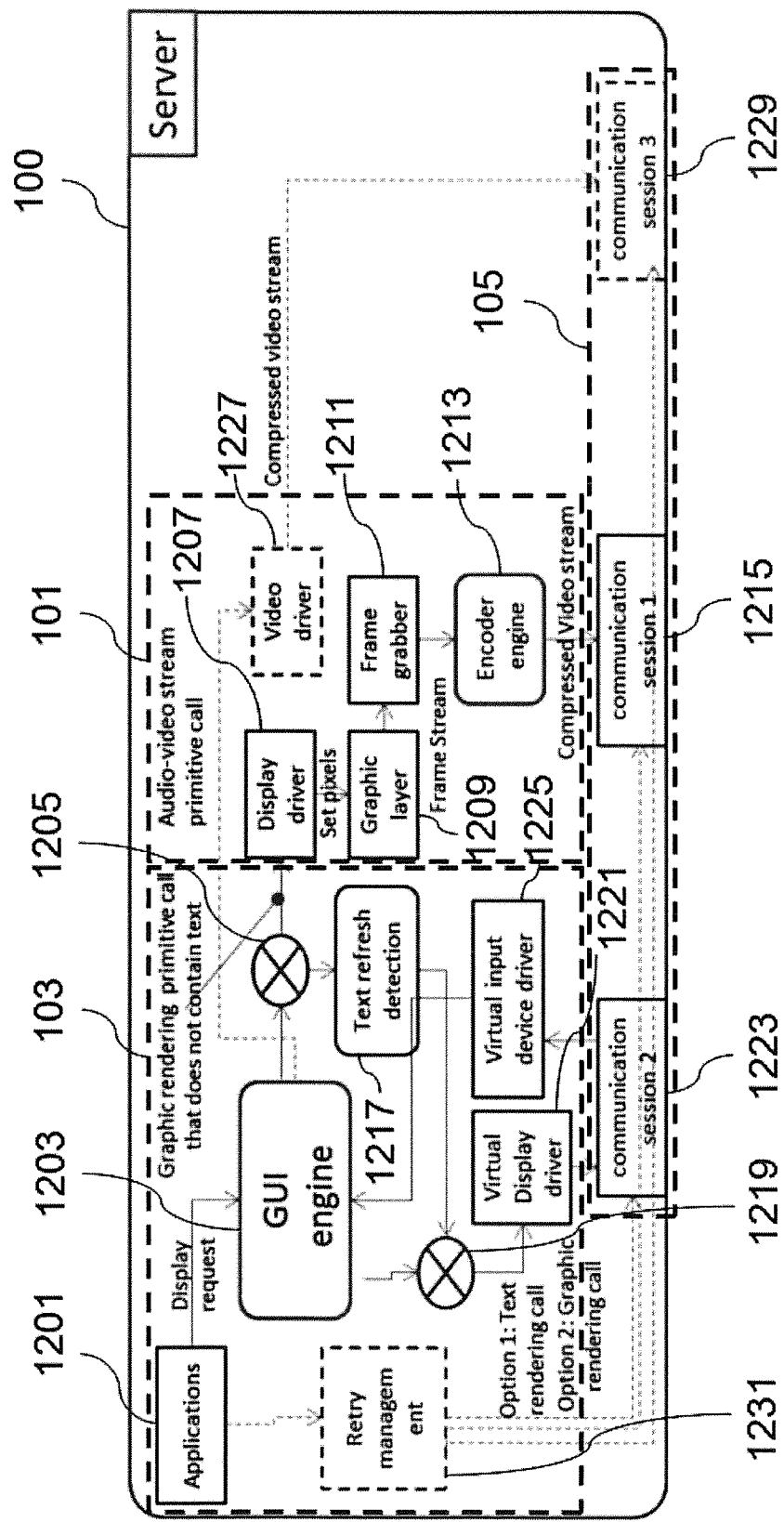
FIG. 12 shows a diagram of a server for providing a graphical user interface to a client over a communication network according to an embodiment.

FIG. 12 shows a diagram of a server 100 for providing a graphical user interface to a client over a communication network according to an embodiment. The server 100 forms a possible implementation of the server 100 as described in conjunction with FIG. 1. The diagram shows a functional view of the server 100 according to an UML (Unified Modeling Language) paradigm.

The server 100 executes an application 1201. The server 100 comprises a GUI engine 1203, a combiner 1205, a display driver module 1207, a graphic layer module 1209, a frame grabber 1211, an encoder engine 1213, a text refresh detector 1217, a combiner 1219, a virtual display driver module 1221, a virtual input device driver module 1225, a video driver module 1227, and a retry management module 1231. The server 100 is configured to establish a first communication session 1215, a second communication session 1223, and a third communication session 1229. A remote user interface (RUI) server can be in charge of establishing the first communication session 1215.

The encoder 101 can comprise the display driver module 1207, the graphic layer module 1209, the frame grabber 1211, the encoder engine 1213, and the video driver module 1227. The detector 103 can execute the application 1201. The detector 103 can comprise the GUI engine 1203, the combiner 1205, the text refresh detector 1217, the combiner 1219, the virtual display driver module 1221, the virtual input device driver module 1225, and the retry management module 1231. The communication interface 105 can be configured to establish the first communication session 1215, the second communication session 1223, and the third communication session 1229.

The application 1201 can provide a display request signal, e.g. indicating a change associated with a graphical user interface element, to the GUI engine 1203. The GUI engine 1203 can provide an audio-video stream primitive call to the video driver module 1227. The combiner 1205 can provide a graphic rendering primitive call that may not contain text, e.g. the element text of the graphical user interface element. The display driver module 1207 can be configured to set pixels of the graphical user interface element within the graphical user interface. The graphic layer module 1209 can provide a frame stream, e.g. forming the video data. The encoder engine 1213 can provide a compressed video stream, e.g. forming compressed video data. The combiner 1219 can provide a text rendering call as a first option, or a graphic rendering call as a second option. The video driver module 1227 can provide the compressed video stream, e.g. forming the compressed video data, for transmission via the third communication session 1229.

The application 1201, when running, can send the display request signal, e.g. indicating a key-down released event, to the GUI engine 1203, which can interpret the signal knowing a graphical context of the graphical user interface element and a state of the application 1201. For example, a key-down released event can be interpreted as a move down focus and/or cursor event of a listbox and can be translated into a "moveTo xyz" request signal associated to a rectangle representing the cursor.

The request signal can be processed and/or filtered by the combiner 1205 which can send it to the text refresh detector 1217. Before the focus is on the "moveTo xyz" request signal, the client, e.g. the client 200 as described in conjunction with FIG. 2, can already have displayed the element text within a display or screen area and the "moveTo xyz" request signal may have broken the element text, e.g. because it indicates a filled rectangle.

A role of the text refresh detector 1217 can be to generate an additional display text request signal in order to refresh and/or repair the element text at the client, e.g. the client 200 as described in conjunction with FIG. 2, using the virtual display driver module 1221. It can perform the same procedures as the display driver module 1207 except that the output request signals may not be provided locally but can be sent to the client, e.g. the client 200 as described in conjunction with FIG. 2, using the second communication session 1223.

The combiner 1219 can be a filter that can, in addition to the request signal of the text refresh detector 1217, also send a request signal of the GUI engine 1203, which can be a conventional text display request signal that the GUI engine 1203 can perform in order to follow a display request signal of the application 1201.

The combiner 1205 can further send request signals which may not be relevant to the display of the element text to the display driver module 1207 and can translate the request signals into a bitmap image. For example, a "moveTo xyz" rectangle can become a "set_list_of_pixel (a, b, c . . . )" rectangle within the graphic layer module 1209, which can be mapped into a framebuffer or memory area which can be capture and/or grabbed by the frame grabber 1211 and can be compressed by the encoder engine 1213 before to be sent to the client, e.g. the client 200 as described in conjunction with FIG. 2, via the first communication session 1215.

The text refresh detector 1217 can further process video rendering request signals, e.g. for providing the element shape, and can then send them to the video driver module 1227 which can decide whether to pass-through them directly to the client, e.g. the client 200 as described in conjunction with FIG. 2, via the third communication session 1229 or to perform a transcoding before doing it in order to send the video data in a format that is supported by the client.

The retry management module 1231 can be optional. Its role can comprise to decide whether to redo or not to redo, e.g. because it may be better to go ahead without redoing, a provision of a request signal of the server 100 or the client, e.g. the client 200 as described in conjunction with FIG. 2. The request signal may not have been received by the client yet. The client may be waiting for it. The application 1201 can provide information, for example a disable retry information, when it knows that it may be useless to retry. The retry management module 1335 of the client as described in conjunction with FIG. 13 can perform the same procedure when it receives information from the components of the client indicating, e.g. after a time-out, that it still waits for a request signal and/or that it may not process a request signal anymore.

An encoding synchronizer can be used in the server 100 to synchronize the encoder engine 1213 with the virtual display driver module 1221. The communication mechanism can be any suitable communication mechanism. The video data can be generated based on a standard video overlay mechanism. The synchronizer in the client 200 can perform parts of the rendering.

The detector 103 can be an interceptor of a display driver call and can also call a virtual display driver which can interpret a high level display call into a low level call. The low level call can be on a bitmap level (option 2) or on a vector level (option 1). In option 1, bitmaps may be supported for supporting logos. A detection of a change may be performed on an uncompress image. The framebuffer of the server 100 may not be encoded if a change only relates to an element text which may not be in the framebuffer but may only lead to transmitted element text data.

Figure 13:
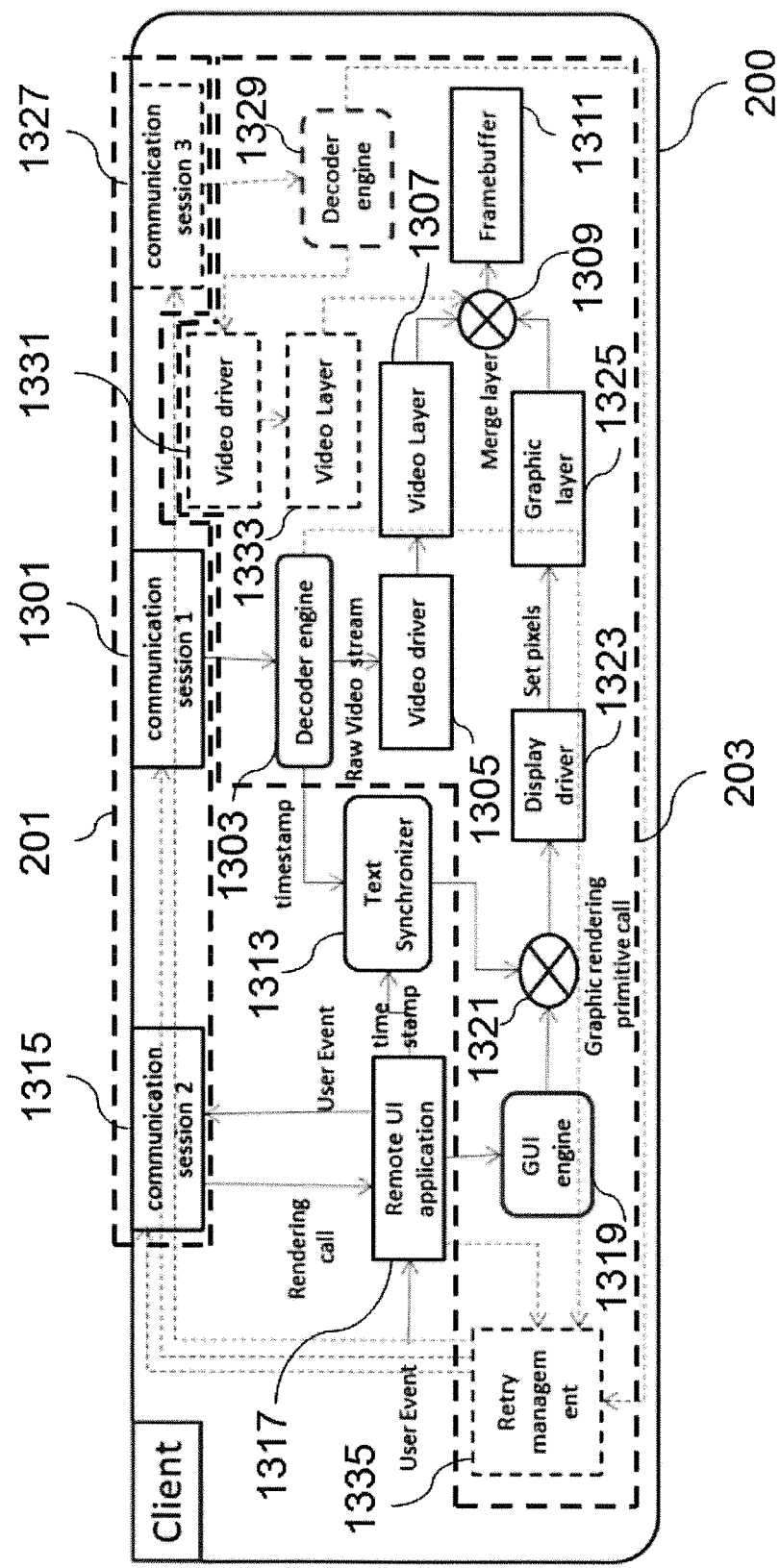
FIG. 13 shows a diagram of a client for retrieving a graphical user interface from a server over a communication network according to an embodiment.

FIG. 13 shows a diagram of a client 200 for retrieving a graphical user interface from a server over a communication network according to an embodiment. The client 200 forms a possible implementation of the client 200 as described in conjunction with FIG. 2.

The client 200 comprises a decoder engine 1303, a video driver module 1305, a video layer module 1307, a combiner 1309, a framebuffer 1311, a text synchronizer 1313, a GUI engine 1319, a combiner 1321, a display driver module 1323, a graphic layer module 1325, a decoder engine 1329, a video driver module 1331, a video layer module 1333, and a retry management module 1335. The client 200 executes a remote user interface (UI) application 1317. The client 200 is configured to establish a first communication session 1301, a second communication session 1315, and a third communication session 1327.

The communication interface 201 can be configured to establish the first communication session 1301, the second communication session 1315, and the third communication session 1327. The combiner 203 can comprise the decoder engine 1303, the video driver module 1305, the video layer module 1307, the combiner 1309, the framebuffer 1311, the GUI engine 1319, the combiner 1321, the display driver module 1323, the graphic layer module 1325, the decoder engine 1329, the video driver module 1331, the video layer module 1333, and the retry management module 1335. The synchronizer as described in conjunction with FIG. 2 can comprise the text synchronizer 1313. The detector as described in conjunction with FIG. 2 can execute the remote user interface (UI) application 1317.

The decoder engine 1303 can provide a timing indicator, e.g. a timestamp, to the text synchronizer 1313, and video data, e.g. a raw video stream, to the video driver module 1305. The combiner 1309 can be configured to merge video layers. The second communication session 1315 can provide a rendering call from the server 100 as described in conjunction with FIG. 1. The remote user interface (UI) application 1317 can receive a user event indicator, e.g. a request signal, and can provide the user event indicator, e.g. the request signal, to be transmitted via the second communication session 1315, and can provide a timing indicator, e.g. a time stamp, to the text synchronizer 1313. The combiner 1321 can provide a graphic rendering primitive call, e.g. for rendering the element text of the graphical user interface element. The display driver module 1323 can be configured to set pixels of the graphical user interface element within the graphical user interface. The text synchronizer 1313 can decide whether the GUI engine 1319 sends a primitive call to the display driver module 1323.

The client 200 can be realized upon the basis of an architecture running an application denoted as remote user interface (UI) application 1317 which can be in charge to receive a request signal in order to display the element text from the server, e.g. the server 100 as described in conjunction with FIG. 1, using the second communication session 1315. This can be realized in order to send the request signal to the local GUI engine 1319, wherein a subset of the GUI engine 1319 being able to render the element text as a bitmap or in a vector representation can be used, and also to send a request signal indicating a user input, e.g. from a key pressed and/or released event, for example from a remote control or any input device employed by the application 1201 running on the server 100 to the server 100.

A further role of the remote user interface (UI) application 1317 can be to transfer a couple (timestamp_text_i, text_display_request_i) to the text synchronizer 1313. The text synchronizer 1313 can queue and sort the requests. The timing indicator, e.g. the timestamp value, from the decoder engine 1303 can be provided as a time reference in order to read the queue. The text synchronizer 1313 can decide whether to allow or to block lower level display request signals from the GUI engine 1319 which can have inherited the timing indicator, e.g. the timestamp, of top level display request signals by filtering using the combiner 1321. Consequently, the display driver module 1323 may only receive the element text display request signal when it makes sense to display it by the graphic layer module 1325.

Via the first communication session 1301, a content of a framebuffer, e.g. without rendered element text of a graphical user interface element, can be received like a video stream using a remote framebuffer (RFB) protocol. The decoder engine 1303 can decode the video stream and can provide the video to the video layer module 1307 by means of the video driver module 1305. The third communication session 1327 and the further decoder engine 1329 can be used when there is a video element, e.g. using a picture in picture (PIP) functionality, embedded into the graphical user interface (GUI).

The combiner 1309 can be used to merge layers, wherein the layers can comprise three parts of the graphical user interface. A first layer can comprise the element text of the graphical user interface element. A second layer can comprise the element shape or graphic of the graphical user interface element. A third layer can comprise the video element of the graphical user interface.

For the first communication session 1215, 1301 as described in conjunction with FIG. 12 and FIG. 13, a packet loose handling mechanism, other than TCP (Transmission Control Protocol), may be applied in order to achieve a low latency. For example, UDP (User Datagram Protocol) in conjunction with a retransmit request for missing video data packets can be applied. For the second communication session 1223, 1315 as described in conjunction with FIG. 12 and FIG. 13, TCP (Transmission Control Protocol) may be applied. The third communication session 1229, 1327 as described in conjunction with FIG. 12 and FIG. 13 may be used for further video data using a decoder in the client 200. The further video data can be provided by a third-party video server.

Embodiments are related to the provision of a remote graphical user interface to a client 200, e.g. comprising a media player, with element text rendering capabilities. Embodiments are related to decreasing the encoding load, e.g. for a fast motion menu, of a graphical user interface. For example, fade-in and/or fade-out effects can be rendered seamlessly on a pure zero client, e.g. the client 200, with using constraint encoding resources at the server 100.

A hardware encoder can be used by the server 100. However, the sharing of the resource can limit the scalability. One hardware encoder may be employed per client in addition to the provision of the server resource used for the rendering of the graphical user interface element.

Embodiments can decrease the resources used to encode a framebuffer of the server 100 and can make it possible to use software encoding on a constraint resource server, e.g. the server 100, while keeping the main rendering on the server 100 using a zero, or nearly zero, client technology. The constraint resource server, e.g. the server 100, can relate to a server which may not provide the processing for all client requests at the same time and which may either have to postpone the processing or may have to lighten the processing load by downgrading the quality of the service.

Embodiments can omit a provision and/or rendering of the element text on the server 100 and transmit the element text to the client 200 in order to provide and/or render it locally at the client 200. As the element text may not be drawn in the framebuffer of the server 100, i.e. characters which can be represented as glyph pixel matrixes may not be copied into the framebuffer, the compression ratio can be better since text usually creates high frequencies which may not be removed by a DCT (Discrete Cosine Transform) encoding process.

As the compression ratio may be better, the frame rate can be increased in order to support fast dynamic GUIs (Graphic User Interfaces), e.g. a menu fade-in and/or fade-out, without increasing the data rate or bandwidth. The additional transmission of data used to transfer the element text draw messages can remain negligible compared to a complete frame transmission.

An implementation of an embodiment of the invention can be based on OpenGL (Open Graphics Library), wherein top API (Application Programming Interface) calls can be omitted on the server 100 and a call may be transferred to the client 200, e.g. using an RPC (Remote Procedure Call) oriented protocol. This can mean that an application programming interface (API) implementation can be replaced by a call to an equivalent but remote function.

Embodiments can provide a client 200, e.g. a vSTB (virtual Set Top Box), which can rely on a limited graphics capability at the client 200, while being able to provide and/or render a rich graphical user interface (GUI), e.g. comprising picture animation, font smoothing, or shading, in an effective way. The client 200 can be Internet based and/or cloud based.

A true or pure zero client technology can make a client cheap but may have the following constraints. It may be based on a single stream, e.g. one MPEG video stream comprising both a video and an overlaying graphical user interface (GUI). This may lead to an increased load on a server which may not be feasible for scalability reasons. It may further be based on a dual stream, e.g. one MPEG video stream for video and one MPEG video stream for the graphical user interface. This may lead to a choice between quality and scalability. For example, for an animation, a system may encode at 30 fps with an almost lossless codec which may not be desired from a user experience point of view. A solution can be to use a mix of a zero client with local rendering of an element text of a graphical user interface element at the client 200.

The element text data can be formatted according to an ITU-T T.128 text message format. The element shape of the graphical user interface element can be rendered by the server 100 as described in conjunction with FIG. 1. The element text of the graphical user interface element can be rendered by the client 200 as described in conjunction with FIG. 2.

The invention claimed is:

1. A server for providing a graphical user interface to a client over a communication network, the graphical user interface comprising a video element and a non-video graphical user interface element, the non-video graphical user interface element being formed by an element shape and an element text, the element shape being represented by non-video element shape data, the element text being represented by element text data, the server comprising:
   at least one processor configured to:
     encode the non-video element shape data into first video data using a first codec;
     encode the video element into second video data using a second codec different from the first codec;
     encode the element text into plain text data and text layout data, the text layout data indicating at least one of a text size or a text font of the element text within the graphical user interface element, the plain text data and the text layout data forming the element text data; and
     detect, by the server, a change associated with the graphical user interface element within the graphical user interface provided by the server; and
   a communication interface configured to separately transmit to the client the first video data in a first video data stream, the second video data in a second video data stream separate from the first video data stream, and the element text data in a text data stream separate from the first video data stream and the second video data stream over the communication network, the element text data being transmitted in response to detection, by the server, of the change associated with the graphical user interface element for providing the graphical user interface to the client by the server.

2. The server of claim 1, wherein:
the first video data comprises a first timing indicator indicating a validity time of the first video data; and
the element text data comprises a second timing indicator indicating a validity time of the element text data.

3. The server of claim 1, wherein the at least one processor is further configured to generate a number of video frames based on the non-video element shape data for encoding the non-video element shape data into the first video data, the number of video frames being arranged to form the first video data.

4. The server of claim 1, wherein the text layout data further indicates a text path of the element text within the graphical user interface element.

5. The server of claim 1, wherein the at least one processor is further configured to encode the element text into image data, the image data representing an image of the element text of the graphical user interface element, the image data forming the element text data.

6. The server of claim 1, wherein the communication interface is configured to:
receive a request signal requesting a change associated with the graphical user interface element within the graphical user interface; and
separately transmit the first video data and the element text data over the communication network in response to receiving the request signal.

7. The server of claim 1, wherein the graphical user interface element comprises a window element, a text box element, a button element, an icon element, a list box element, a menu element, or a carousel menu element.

8. The server of claim 1, wherein the change associated with the graphical user interface element comprises a rearrangement of the graphical user interface element within the graphical user interface, a scaling of the graphical user interface element within the graphical user interface, or a modification of the element text of the graphical user interface element within the graphical user interface.

9. A client for retrieving a graphical user interface from a server over a communication network, the graphical user interface comprising a video element and a non-video graphical user interface element, the graphical user interface element being formed by an element shape and an element text, the element shape being represented by non-video element shape data, the element text being represented by element text data, the client comprising:
a communication interface configured to separately receive, from the server, first video data in a first video data stream, second video data in a second video data stream separate from the first video data stream, and the element text data in a text data stream separate from the first video data stream and the second video data stream over the communication network, the first video data obtained by encoding the non-video element shape data using a first codec, the second video data obtained by encoding the video element using a second codec different from the first codec, the element text data comprising plain text data and text layout data, the text layout data indicating at least one of a text size or a text font of the element text within the graphical user interface element; and
at least one processor configured to combine the first video data, the second video data, and the element text data for retrieving the graphical user interface from the server;
wherein the element text data is received in response to the server detecting a change associated with the graphical user interface element within the graphical user interface provided by the server.

10. The client of claim 9, wherein:
the first video data comprises a first timing indicator indicating a validity time of the first video data;
the element text data comprises a second timing indicator indicating a validity time of the element text data;
the at least one processor is configured to synchronize the first video data with the element text data in time based on the first timing indicator and the second timing indicator; and
the at least one processor is configured to combine the first video data with the element text data in response to synchronization of the first video data with the element text data.

11. The client of claim 9, wherein:
the at least one processor is configured to detect a request for a change associated with the graphical user interface element within the graphical user interface to obtain a request signal; and
the communication interface is configured to transmit the request signal over the communication network in response to detection of the request for the change associated with the graphical user interface element.

12. A method for providing, by a server, a graphical user interface to a client over a communication network, the graphical user interface comprising a video element and a non-video graphical user interface element, the graphical user interface element being formed by an element shape and an element text, the element shape being represented by non-video element shape data, the element text being represented by element text data, the method comprising:
encoding the non-video element shape data into first video data using a first codec;
encoding the video element into second video data using a second codec different from the first codec;
encoding the element text into plain text data and text layout data, the text layout data indicating at least one of a text size or a text font of the element text within the graphical user interface element, the plain text data and the text layout data forming the element text data;
detecting, by the server, a change associated with the graphical user interface element within the graphical user interface provided by the server; and
separately transmitting to the client the first video data in a first video data stream, the second video data in a second video data stream separate from the first video data stream, and the element text data in a text data stream separate from the first video data stream and the second video data stream over the communication network, the element text data being transmitted in response to detection, by the server, of the change associated with the graphical user interface element for providing the graphical user interface to the client by the server.

13. The method of claim 12, wherein: the first video data comprises a first timing indicator indicating a validity time of the first video data; and the element text data comprises a second timing indicator indicating a validity time of the element text data.

14. The method of claim 12, further comprising generating a number of video frames based on the non-video element shape data for encoding the non-video element shape data into the first video data, the number of video frames being arranged to form the first video data.

15. The method of claim 12, wherein the text layout data further indicates a text path of the element text within the graphical user interface element.

16. The method of claim 12, further comprising encoding the element text into image data, the image data representing an image of the element text of the graphical user interface element, the image data forming the element text data.

17. The method of claim 12, further comprising:
receiving a request signal requesting a change associated with the graphical user interface element within the graphical user interface; and
separately transmitting the first video data and the element text data over the communication network in response to receiving the request signal.

18. The method of claim 12, wherein the graphical user interface element comprises a window element, a text box element, a button element, an icon element, a list box element, a menu element, or a carousel menu element.

19. The method of claim 12, wherein the change associated with the graphical user interface element comprises a rearrangement of the graphical user interface element within the graphical user interface, a scaling of the graphical user interface element within the graphical user interface, or a modification of the element text of the graphical user interface element within the graphical user interface.

* * * * *